(12) United States Patent
Takaura et al.

(10) Patent No.: US 7,529,032 B2
(45) Date of Patent: May 5, 2009

(54) PROJECTION OPTICAL SYSTEM AND IMAGE DISPLAY APPARATUS

(75) Inventors: Atsushi Takaura, Tokyo (JP); Issei Abe, Kanagawa (JP); Kazuhiro Fujita, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 12 days.

(21) Appl. No.: 11/742,036

(22) Filed: Apr. 30, 2007

(65) Prior Publication Data
US 2007/0253076 A1    Nov. 1, 2007

(30) Foreign Application Priority Data

May 1, 2006    (JP)    ............................. 2006-127840
Feb. 27, 2007  (JP)    ............................. 2007-047702

(51) Int. Cl.
*G02B 9/00*   (2006.01)
*G02B 17/00*  (2006.01)
*G03B 21/28*  (2006.01)

(52) U.S. Cl. .......................... 359/649; 359/727; 353/98
(58) Field of Classification Search ......... 359/649–651, 359/726, 727; 353/98
See application file for complete search history.

(56) References Cited

U.S. PATENT DOCUMENTS 5,764,407 A    6/1998  Nanba 7,048,388 B2    5/2006  Takaura et al.
7,239,452 B2 *  7/2007  Kuwa ........................ 359/649
2006/0126032 A1  6/2006  Takaura et al.

FOREIGN PATENT DOCUMENTS

| JP | 2001-264634 | 9/2001 |
| JP | 2003-161885 | 6/2003 |
| JP | 2004-133483 | 4/2004 |
| JP | 2004-258620 | 9/2004 |
| JP | 2005-292813 | 10/2005 |

* cited by examiner

*Primary Examiner*—William C Choi
(74) *Attorney, Agent, or Firm*—Oblon, Spivak, McClelland, Maier & Neustadt, P.C.

(57) ABSTRACT

A disclosed projection optical system for projecting and forming an enlarged image of an image displayed in a planar manner as an object includes: a lens system including, from an object side, at least a lens group providing telecentricity to an object space side, a lens group controlling divergence of angles of view, a diaphragm, a lens group converging the angles of view, and a lens group converging and subsequently enlarging the angles of view; and a catoptric system disposed on an image side relative to the lens system and including a mirror having negative power. Each lens group of the lens system and the mirror having negative power share an optical axis and the optical axis is shifted relative to a center of an object surface.

11 Claims, 11 Drawing Sheets

PROJECTION OPTICAL SYSTEM AND IMAGE DISPLAY APPARATUS

BACKGROUND OF THE INVENTION

1. Field of the Invention

The present invention relates to a projection optical system and an image display apparatus.

2. Description of the Related Art

Image display apparatuses of projector type are known in which still images such as characters, pictures, and the like and moving images two-dimensionally displayed on a small-sized light valve are enlarged and projected for image display through a projection optical system. Examples of light valves include transmissive liquid crystal panels, DLP (Digital Light Processor), and LCOS (Liquid Crystal on Silicon) superior in contrast characteristics.

Examples of image display apparatuses include front projection types in which an image on the light valve is enlarged and projected onto a projection surface such as a reflective screen disposed at a distance from the apparatus, and then a reflected light is viewed and rear projection types in which a transmissive screen is disposed inside the apparatus as the projection surface and the image on the light valve is enlarged and projected from a back of the screen, and then the image is viewed from a front of the apparatus.

Patent Document 1 discloses a combination of a wide-angle lens disposed on an object side with a curved mirror having negative power as a projection optical system for the rear projection type.

Patent Document 2 discloses a projection optical system in which an intermediate image is formed using a lens system telecentric on the object side and the intermediate image is formed on the screen as an object image using a reflecting optical system having positive power.

Patent Document 3 discloses a projection optical system in which an image is formed on the screen using the lens system telecentric on the object side and a Mangin mirror having negative power.

Patent Document 1: Japanese Laid-Open Patent Application No. 2004-133483

Patent Document 2: Japanese Laid-Open Patent Application No. 2004-258620

Patent Document 3: Japanese Laid-Open Patent Application No. 2005-292813

The projection optical system disclosed in Patent Document 1 has a short back focal distance and is not telecentric on the object side, so that it is not readily applied to a reflective light valve such as LCOS. In fact, in Patent Document 1, DMD (Digital Mirror Device) is assumed to be used for image display.

The projection optical system disclosed in Patent Document 2 is telecentric on the object side and application to the reflective light valve is disclosed. However, a catoptric system has positive power, so that when magnification is to be increased, an optical path length for image forming is likely to be increased. Thus, in an image display apparatus of rear projection type, depth or height of the apparatus is likely to be increased.

The projection optical system disclosed in Patent Document 3 is telecentric on the object side and application to the reflective light valve is disclosed. However, the Mangin mirror having negative power is used for the catoptric system and manufacturing of the Mangin mirror is difficult in comparison with manufacturing of a normal mirror and a cost thereof is increased.

SUMMARY OF THE INVENTION

It is a general object of the present invention to provide an improved and useful projection optical system and image display apparatus in which the above-mentioned problems are eliminated.

A more specific object of the present invention is to provide a projection optical system superior in responsibility to the reflective light valve such as LCOS, capable of obtaining high resolving power without using the Mangin mirror as in a conventional technique, capable of preferably correcting distortion as appropriate upon projecting obliquely onto the image surface, and capable of achieving a short projection distance and reducing thickness and size thereof, and to provide an image display apparatus using the projection optical system.

Another object of the present invention is to specify an optimal range for power of each lens group and a focal distance, to improve resolution capability in the projection optical system, and to contribute to reduction of aspherical mirror in the catoptric system.

According to one aspect of the present invention, there is provided a projection optical system for projecting and forming an enlarged image of an image displayed in a planar manner as an object, the projection optical system comprising: a lens system including, from an object side, at least a lens group providing telecentricity to an object space side, a lens group controlling divergence of angles of view, a diaphragm, a lens group converging the angles of view, and a lens group converging and subsequently enlarging the angles of view; and a catoptric system disposed on an image side relative to the lens system and including a mirror having negative power, wherein each lens group of the lens system and the mirror having negative power share an optical axis and the optical axis is shifted relative to a center of an object surface (on which a planar image is displayed). In this case, the expression "providing telecentricity" includes maintaining telecentricity on the object space side and controlling divergence on the object space side so as to telecentrically project light fluxes.

According to another aspect of the present invention, there is provided a projection optical system for projecting and forming an enlarged image of an image displayed in a planar manner as an object, the projection optical system comprising: a lens system including four lens groups; a diaphragm disposed in the lens system; and a catoptric system including a mirror having negative power, wherein each lens group of the lens system and the mirror having negative power share an optical axis, an object side of the lens system is substantially telecentric, and the optical axis is shifted relative to a center of an object surface (on which a planar image is displayed). In this case, the expression "substantially telecentric" means that an angle of principal rays incident on a lens surface disposed closest to the image side forms not more than about ±5 relative to the optical axis.

According to another aspect of the present invention, in the above-mentioned projection optical system, the lens groups of lens system are arranged sequentially from the object side as a first lens group to a fourth lens group, the first lens group to the third lens group have positive power and integrated power of the third lens group and the fourth lens group is negative, and the diaphragm is disposed between the second lens group and the third lens group.

According to another aspect of the present invention, in the above-mentioned projection optical system, the lens groups of lens system are arranged sequentially from the object side as a first lens group to a fourth lens group, the first lens group to the third lens group have positive power and integrated power of the fourth lens group without a lens disposed closest to the image side is negative, the lens disposed closest to the image side has a meniscus shape convex relative to the image side, and the diaphragm is disposed between the second lens group and the third lens group. In this case, preferably, a cemented lens is disposed on the object side relative to the diaphragm.

According to another aspect of the present invention, there is provided a projection optical system for projecting and forming an enlarged image of an image displayed in a planar manner as an object, the projection optical system comprising: a lens system including, from an object side, at least a lens group providing telecentricity to an object space side, a diaphragm, a lens group controlling divergence of angles of view, a lens group converging the angles of view, and a lens group converging and subsequently enlarging the angles of view; and a catoptric system disposed on an image side relative to the lens system and including a mirror having negative power, wherein each lens group of the lens system and the mirror having negative power share an optical axis and the optical axis is shifted relative to a center of an object surface (on which a planar image is displayed).

According to another aspect of the present invention, in the projection optical system, the lens groups of lens system are arranged sequentially from the object side as a first lens group to a fourth lens group, the first lens group and the second lens group have positive power and integrated power of the third lens group and the fourth lens group is negative, and the diaphragm is disposed between the first lens group and the second lens group.

According to another aspect of the present invention, in the projection optical system, the lens groups of lens system are arranged sequentially from the object side as a first lens group to a fourth lens group, the first lens group to the third lens group have positive power and integrated power of the fourth lens group without a lens disposed closest to the image side is negative, the lens disposed closest to the image side has a meniscus shape convex relative to the image side, and the diaphragm is disposed between the first lens group and the second lens group. In this case, preferably, a cemented lens is disposed on the object side relative to the diaphragm.

According to another aspect of the present invention, when the lens system is constructed using the four lens groups and power arrangement of each lens group is set and the lens disposed closest to the image side is a meniscus lens convex relative to the image side as mentioned above, because of the negative power of the mirror included in the catoptric system, a long back focal distance, and the telecentricity of the lens system on the object side, it is possible to obtain a projection optical system with a wide angle on the image side, a short projection distance, and high resolution, the projection optical system being capable of correcting distortion of an image even when obliquely projecting on the image surface. Further, by disposing the diaphragm between the second lens group and the third lens group or between the first lens group and the second lens group, it is possible to obtain a large vignetting factor.

According to another aspect of the present invention, by disposing the cemented lens on the object side relative to the diaphragm, it is possible to preferably correct chromatic difference of magnification.

According to another aspect of the present invention, in the above-mentioned projection optical system, at least one aspherical surface is included in the lens system. In this case, preferably, not more than two aspherical surfaces are disposed in the lens system. By using the aspherical lens surface, it is possible to preferably correct imaging capability.

According to another aspect of the present invention, in projection optical system, preferably, both surfaces of the lens of the fourth lens group in the lens system disposed closest to the image side are aspherical. In this case, preferably, the lens of the fourth lens group disposed closest to the image side is made of synthetic resin.

By using synthetic resin for materials for the lens having aspherical surfaces on both sides, it is possible to reduce a cost of mass production of projection optical systems.

According to another aspect of the present invention, in the above-mentioned projection optical system, a mirror surface of the mirror having negative power in the catoptric system may be a rotationally-symmetric aspherical surface. In this case, the rotationally-symmetric aspherical surface of the mirror surface of the mirror having negative power in the catoptric system preferably includes odd terms and even terms. The rotationally-symmetric aspherical surface is readily formed, so that it is possible to reduce a manufacturing cost. Further, because of the aspherical surface having odd terms in addition to even terms, it is possible to preferably correct image distortion accompanied by wide angle and oblique projection.

According to another aspect of the present invention, in the projection optical system, at least one mirror for flexing optical path is disposed in the lens system or between the lens system and a mirror of the catoptric system disposed closest to the lens system. By using such a mirror for flexing optical path, it is possible to fold an optical path of the projection optical system, so that it is possible to reduce a thickness of an image display apparatus employing the projection optical system.

According to another aspect of the present invention, in the above-mentioned projection optical system, when a focal distance of the first lens group is f1, a focal distance of the second lens group is f2, a combined focal distance of the third lens group and the fourth lens group is f3, and a combined focal distance of the first lens group to the fourth lens group is f, the following formulas (1) to (3) are satisfied, $$2.7 < f1/f \quad (1)$$

$$f2/f < 8.8 \quad (2)$$

$$-9.4 < f3/f \quad (3).$$

These conditions enable thin projection and are advantageous for improving resolution capability.

According to another aspect of the present invention, in the projection optical system, the following formulas (4) to (6) are further satisfied, $$79 < f1 < 81 \quad (4)$$

$$f2 < 253 \quad (5)$$

$$-275 < f3 \quad (6).$$

These conditions enable thin projection and are advantageous for improving resolution capability.

According to another aspect of the present invention, in the projection optical system, when a focal distance of the first lens group is f1, a focal distance of the second lens group is f2, a combined focal distance of the third lens group and the fourth lens group is f3, and a combined focal distance of the first lens group to the fourth lens group is f, the following formulas (7) to (9) are satisfied, $$f1/f<3.0 \qquad (7)$$

$$7.7<f2/f \qquad (8)$$

$$f3/f<-5.6 \qquad (9).$$

These conditions enable thin projection and are advantageous for reducing a size of the mirror.

According to another aspect of the present invention, in the projection optical system, the following formulas (10) to (12) are further satisfied, $$79<f1<81 \qquad (10)$$

$$210<f2 \qquad (11)$$

$$f3<-152 \qquad (12).$$

These conditions enable thin projection and are advantageous for reducing the size of the mirror.

According to another aspect of the present invention, in the projection optical system, when a focal distance of the first lens group is f1, a focal distance of the second lens group is f2, a combined focal distance of the third lens group and the fourth lens group is f3, and a combined focal distance of the first lens group to the fourth lens group is f, the following formulas (13) to (15) are satisfied, $$2.8<f1/f<3.0 \qquad (13)$$

$$7.9<f2/f<8.2 \qquad (14)$$

$$-7.2<f3/f<-6.0 \qquad (15).$$

These conditions enable thin projection and are advantageous for obtaining higher MTF and reducing the size of the mirror.

According to another aspect of the present invention, in the projection optical system, the following formulas (16) to (18) are further satisfied, $$79<f1<81 \qquad (16)$$

$$210<f2<230 \qquad (17)$$

$$-202<f3<-153 \qquad (18).$$

These conditions enable thin projection and are advantageous for obtaining higher MTF and reducing the size of the mirror.

According to another aspect of the present invention, there is provided an image display apparatus for enlarging and projecting an image so as to form an image using the above-mentioned projection optical system, the image to be enlarged and projected being displayed on an image display surface of a light valve in a planar manner and lighted using a lighting unit.

According to another aspect of the present invention, in the image display apparatus, the light valve may be a reflective light valve. In addition, the light valve may be a transmissive light valve. Preferably, LCOS is used as the reflective light valve.

According to another aspect of the present invention, in the image display apparatus, the light valves includes three light valves for displaying each component image of three primary colors, and light fluxes modulated in the three light valves are integrated and guided to the projection optical system so as to project and form a color image. By using the three light valves, it is possible to display a color image having resolution higher than color image display using a single valve.

According to another aspect of the present invention, in the image display apparatus, the light valve, the lighting unit lighting the light valve, the projection optical system, and an image display unit onto which an enlarged image is projected may be integrated. The image display unit employs a reflective screen when the image display unit is of a front projection type or a transmissive screen when the image display unit is of a rear projection type.

As mentioned above, in the projection optical system according to the present invention, the lens system disposed on the object side substantially has telecentricity on the object space side, so that it is possible to use LCOS superior in responsibility and contrast properties as the reflective light valve for displaying an image in a planar manner. The catoptric system disposed on the image side includes the mirror having negative power. Thus, because of the negative power, it is possible to enlarge angles of view of light fluxes for image formation and form an enlarged image with a reduced optical path, thereby reducing the thickness of the image display apparatus.

In the projection optical system, the optical axis is shifted relative to the center of the object surface on which the planar image is displayed, so that it is possible to make a height of a center of the image surface higher than a height of the center of the object surface.

Further, by employing an aspherical shape for the mirror surface of the mirror having negative power in the catoptric system disposed on the image side, it is possible to display an enlarged image with high quality.

It is possible to project the image on the LCOS panel onto the projection surface in an oblique manner relative to a normal line of the projection surface without using the Mangin mirror while high resolution and a reduced projection distance are provided. In accordance with this, it is possible to avoid difficulty in production resulting from the use of the Mangin mirror and an increase of cost.

By sharing the optical axis, assembly and adjustment of the optical system is readily made.

It is possible to have a long back focal distance and a structure superior in responsibility to the reflective light valve such as LCOS. Further, with the specified position of the diaphragm, it is possible to realize a system having a high peripheral brightness ratio.

By optimizing the focal distance of the lens system, even when projection is performed with high magnification of not less than 80 times, it is possible to obtain preferable resolution capability in a high resolution level of QXGA. By optimizing the focal distance of the lens system, even in a projection screen size of about 60 inches, it is possible to obtain preferable resolution capability in the high resolution level of QXGA. By optimizing the focal distance of the lens system, it is possible to perform projection with high magnification of not less than 80 times without increasing a size of the aspherical mirror and to obtain preferable resolution capability in the high resolution level of QXGA.

By optimizing the focal distance of the lens system, it is possible to enlarge and project an image onto a screen having a projection screen size of about 60 inches without increasing the size of the aspherical mirror.

Other objects, features and advantage of the present invention will become more apparent from the following detailed description when read in conjunction with the accompanying drawings.

DETAILED DESCRIPTION OF THE PREFERRED EMBODIMENTS

Figure 1:
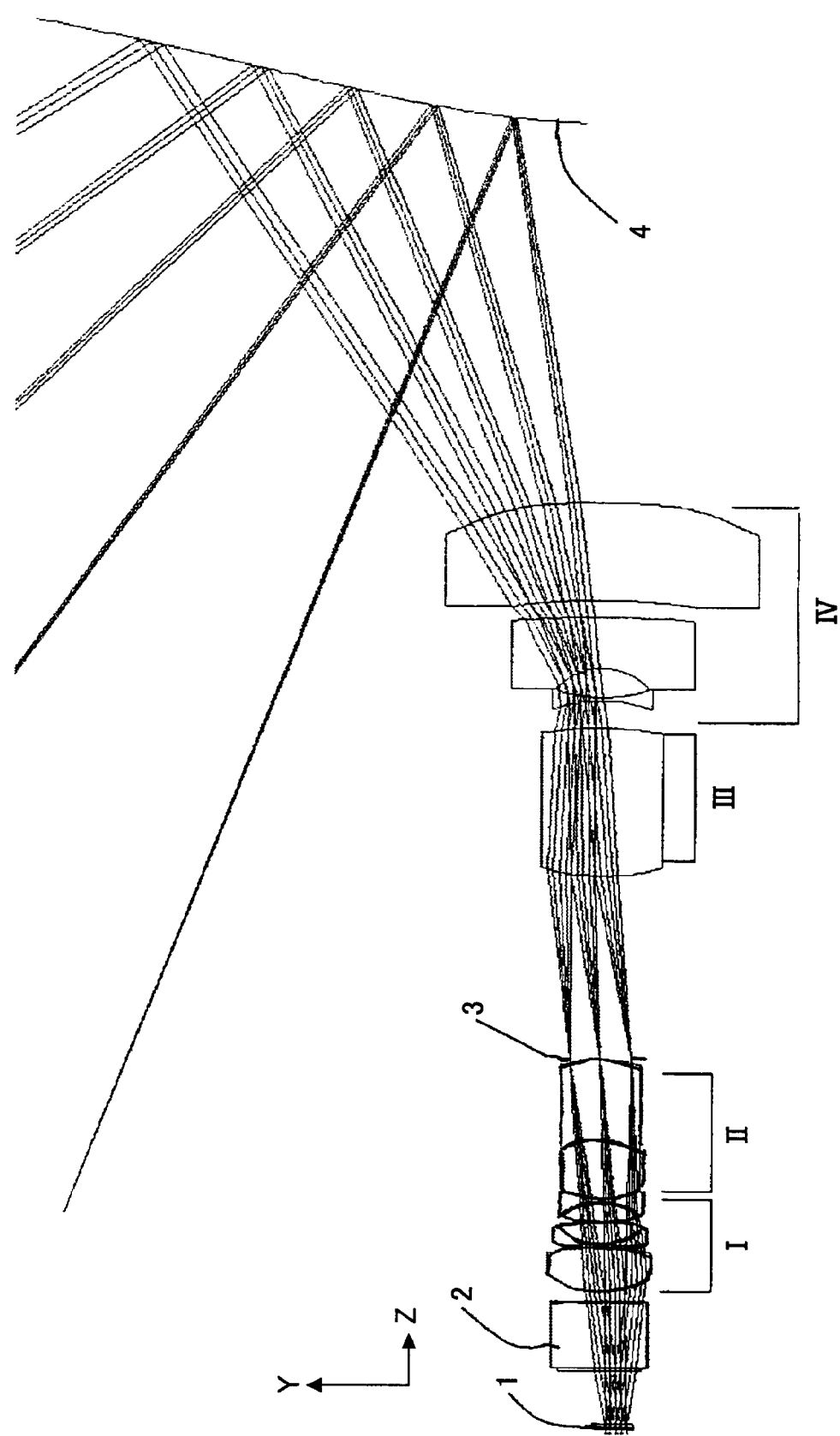
FIG. 1 is a diagram showing a projection optical system according to a first embodiment of the present invention.

FIG. 1 is a diagram showing a projection optical system according to a first embodiment of the present invention.

Reference numeral 1 in FIG. 1 indicates an object surface as an image displayed in a planar manner which will become an object in image forming of the projection optical system. Specifically, the object surface 1 is an image display surface of a light valve. In the present embodiment, the object surface 1 is assumed to be an image display surface of a reflective light valve. An image display surface of a transmissive light valve may be used instead of the image display surface of the reflective light valve. In the present embodiment, color image display is assumed in which three reflective light valves are used and the three light valves are disposed on positions equivalent relative to the projection optical system, so that the object surface 1 represents three object surfaces.

Reference numeral 2 indicates "a system configured by combining a polarization beam splitter for guiding a light from a light source to each light valve with a cross prism for integrating light fluxes reflected on each light valve" as a transparent plate having an optical path length equivalent relative to the system.

Reference numerals I to IV indicate a first lens group I to a fourth lens group IV. The first lens group I to the fourth lens group IV constitute a lens system. Reference numeral 3 indicates a diaphragm disposed between the second lens group II and the third lens group III. Reference numeral 4 indicates a mirror having negative power included in the catoptric system.

As shown in FIG. 1, an object space side of the first lens group I in the lens system is telecentric. Power of the first lens group I is 0.0018, power of the second lens group II is 0.0179, and power of the third lens group III is 0.010. Each power of the first to the third lens groups is positive. In the fourth lens group IV, integrated power without a lens disposed closest to an image side is −0.0436 and negative and the lens disposed closest to the image side is a meniscus lens convex relative to the image surface.

An optical axis of the lens system is set to be shifted upward relative to the object surface 1 in the figure. This means that components on the optical axis are not used.

A diaphragm 3 is disposed between the second lens group II and the third lens group III. Principal rays of different angles of view emitted from the object surface 1 cross the optical axis at the diaphragm 3 and a height of marginal rays corresponds to a diameter of the diaphragm. The first lens group I to the fourth lens group IV constituting the lens system are coaxially disposed in which the optical axis is shared.

A mirror surface of a mirror 4 with negative power has a rotationally-symmetric aspherical shape and is coaxially disposed relative to the lens system. In other words, the mirror 4 is not eccentric relative to the optical axis of the lens system. Thus, the lens system and the catoptric system constituting the projection optical system share the optical axis.

The rotationally-symmetric aspherical shape of the mirror 4 is an aspherical shape including even terms and odd terms as aspherical coefficients. The aspherical shape including the even terms and the odd terms has c as paraxial curvature, K as a conic constant, and Ai (i=1, 2, 3, . . . ) as aspherical coefficients and is expressed as the following formula:

$$Z(r)=(cr^2)/[1+\sqrt{\{1-(1+K)c^2r^2\}}]+A1 \cdot r+A2 \cdot r^2+A3 \cdot r^3+A4 \cdot r^4+ \ldots$$

where r represents a distance from the optical axis and z represents depth in an optical axis direction.

In other words, the projection optical system shown in FIG. 1 includes the lens system having, from an object side, the first lens group I providing telecentricity to the object space side, the second lens group II controlling divergence of angles of view, the diaphragm 3, the third lens group III converging the angles of view, and the fourth group IV converging and subsequently enlarging the angles of view, and the catoptric system disposed on the image side relative to the lens system and including the mirror 4 having negative power. Each lens group of the lens system and the mirror 4 share the optical axis and the optical axis is shifted relative to a center of the object surface 1. According to this structure, it is possible to reduce thickness and size of the image display apparatus.

The projection optical system according to the first embodiment of the present invention as shown in FIG. 1 is a projection optical system for projecting an image displayed in a planar manner as an object and forming an enlarged image of the object. The projection optical system includes the lens system having the four of the first lens group I to the fourth lens group IV and the catoptric system including the mirror 4 having negative power. Each lens group of the lens system and the mirror 4 having negative power share the optical axis. The diaphragm 3 is disposed in the lens system. The object side of the lens system is substantially telecentric and the optical axis is shifted relative to the center of the object surface 1. According to this structure, it is possible to reduce thickness and size of the image display apparatus.

In the lens system, the first lens group I to the fourth lens group IV are disposed sequentially from the object side and the first lens group I to the third lens group III have positive power. In the fourth lens group IV, integrated power without the lens disposed closest to the image side is negative and the lens disposed closest to the image side has a meniscus shape convex relative to the image side. The diaphragm 3 is disposed between the second lens group II and the third lens group III. In this manner, because of the negative power of the mirror included in the catoptric system, a long back focal distance, and the telecentricity of the lens system on the object side, it is possible to obtain a projection optical system with a wide angle on the image side, a short projection distance, and high resolution, the projection optical system being capable of correcting distortion of an image even when obliquely projecting onto the image surface. Further, by disposing the diaphragm 3 between the second lens group II and the third lens group III, it is possible to obtain a large vignetting factor.

In addition, as shown in FIG. 1, in the first lens group I positioned on an object side relative to the diaphragm 3, two pairs of cemented lenses are disposed. By disposing the cemented lenses on the object side relative to the diaphragm 3, it is possible to preferably correct chromatic difference of magnification.

Moreover, the mirror surface of the mirror 4 with negative power in the catoptric system has a rotationally-symmetric aspherical shape including odd terms. The rotationally-symmetric aspherical shape is readily formed, so that it is possible to reduce a manufacturing cost. Because of the aspherical surface having odd terms in addition to even terms, it is possible to preferably correct the image distortion accompanied by the wide angle and oblique projection.

In the lens system, the feature that the lens disposed closest to the image side has a meniscus shape convex relative to the image side is not limited this.

In the lens system, the first lens group I to the fourth lens group IV may be disposed sequentially from the object side, the first lens group I to the third lens group III may have positive power, integrated power of the third lens group III and the fourth lens group IV may be negative, and the diaphragm 3 may be disposed between the second lens group II and the third lens group III.

In the following, a specific numerical example according to the first embodiment shown in FIG. 1 is described.

NUMERICAL EXAMPLE 1

Table 1 shows data on numerical example 1.

In Table 1, "No." is a surface number from the object side including both sides of the transparent plate referenced at reference numeral 2 and a surface of the diaphragm 3. No. 0 indicates the object surface and No. 15 indicates the surface of the diaphragm 3. R indicates radius of curvature, D indicates a space between surfaces, Nd indicates a refractive index of a material relative to d line, and vd indicates an Abbe number.

TABLE 1

| No. | R | D | Nd | vd | Note |
|---|---|---|---|---|---|
| 0 | 0.00 | 27.25 | | | Object surface |
| 1 | 0.00 | 36.90 | 1.517 | 64.1 | |
| 2 | 0.00 | 4.85 | | | |
| 3 | 45.11 | 22.41 | 1.497 | 81.6 | |
| 4 | −126.86 | 0.10 | | | |
| 5 | 183.63 | 1.60 | 1.786 | 44.2 | |
| 6 | 31.31 | 10.99 | 1.497 | 81.6 | |
| 7 | −145.02 | 0.10 | | | |
| 8 | 71.13 | 10.39 | 1.497 | 81.6 | |
| 9 | −33.79 | 1.60 | 1.834 | 37.1 | |
| 10 | 50.68 | 0.10 | | | |
| 11 | 47.31 | 29.42 | 1.620 | 36.3 | |
| 12 | −36.81 | 0.24 | | | |
| 13 | −35.36 | 40.69 | 1.488 | 70.4 | |
| 14 | −71.37 | 0.10 | | | |
| 15 | 0.00 | 92.73 | | | Diaphragm |
| 16 | 104.77 | 75.05 | 1.773 | 49.6 | |
| 17 | −195.68 | 14.04 | | | |
| 18 | −71.18 | 1.60 | 1.603 | 60.5 | |
| 19 | 66.44 | 15.00 | | | |
| 20 | −31.07 | 26.22 | 1.696 | 36.2 | |

TABLE 1-continued

| No. | R | D | Nd | vd | Note |
|---|---|---|---|---|---|
| 21 | −497.88 | 8.12 | | | |
| 22 | 0.00 | 49.50 | 1.492 | 57.8 | Aspherical surface |
| 23 | 0.00 | 192.49 | | | Aspherical surface |
| 24 | −133.33 | −250.00 | | | Aspherical surface |
| 25 | 0.00 | 300.00 | | | Reflection surface |
| 26 | 0.00 | | | | Image surface |

Table 2 shows data on an aspherical surface of No. 22 (lens surface on the object side of the lens disposed closest to the image side in the fourth lens group IV).

TABLE 2

| Aspherical surface (No. 22) | | | | |
|---|---|---|---|---|
| K | A4 | A6 | A8 | A10 |
| −9.48E8 | −1.80E−6 | 6.85E−10 | −7.22E−14 | 8.45E−19 |

Table 3 shows data on an aspherical surface of No. 23 (lens surface on the image side of the lens disposed closest to the image side in the fourth lens group IV).

TABLE 3

| Aspherical surface (No. 23) | | | | |
|---|---|---|---|---|
| K | A4 | A6 | A8 | A10 |
| −2.92E6 | −1.04E−6 | 1.85E−1 | −2.51E−14 | 1.89E−18 |

Table 4 shows data on an aspherical surface of No. 24 (mirror surface of the mirror 4)

TABLE 4

| Aspherical surface (No. 24) | |
|---|---|
| K | −3.59 |
| A1 | −0.07 |
| A2 | 4.60E−02 |
| A3 | −3.43E−05 |
| A4 | 1.65E−07 |
| A5 | −4.87E−10 |
| A6 | 8.06E−13 |
| A7 | −5.74E−16 |
| A8 | 4.03E−21 |

In addition, No. 25 in Table 1 indicates a reflection surface of a plane mirror (constituting the catoptric system with the mirror 4 and not shown in FIG. 1) for reflecting light fluxes reflected on the mirror 4 to a screen side.

In the projection optical system according to specific numerical example 1, as described above, at least one aspherical surface (No. 22, 23) are included in the lens system, namely, two aspherical surfaces are disposed in the lens system. Both sides (No. 22, 23) of the lens (meniscus lens convex relative to the image side) disposed closest to the image side in the fourth lens group IV are aspherical surfaces. Further, the lens disposed closest to the image side in the fourth lens group IV is made of synthetic resin. In this manner, by using the aspherical surface lens, it is possible to preferably correct imaging capability. Moreover, by using synthetic resin for a material of the lens having aspherical surfaces on both sides, it is possible to readily form the aspherical surfaces and reduce a cost of mass production of projection optical systems.

In numerical example 1, magnification is 85.7 times and when a reflective light valve having a diagonal length of 0.7 inches is used, it is possible to enlarge and project an image onto a screen having a diagonal length of 60 inches.

Light fluxes shown in FIG. 1 are displayed based on five angles of view of 0.0, 0.25, 0.5, 0.75, and 1.0 in an object-height ratio in a −Y direction in FIG. 1 from a position closest to the optical axis as a base point in the object surface 1.

Figure 2:
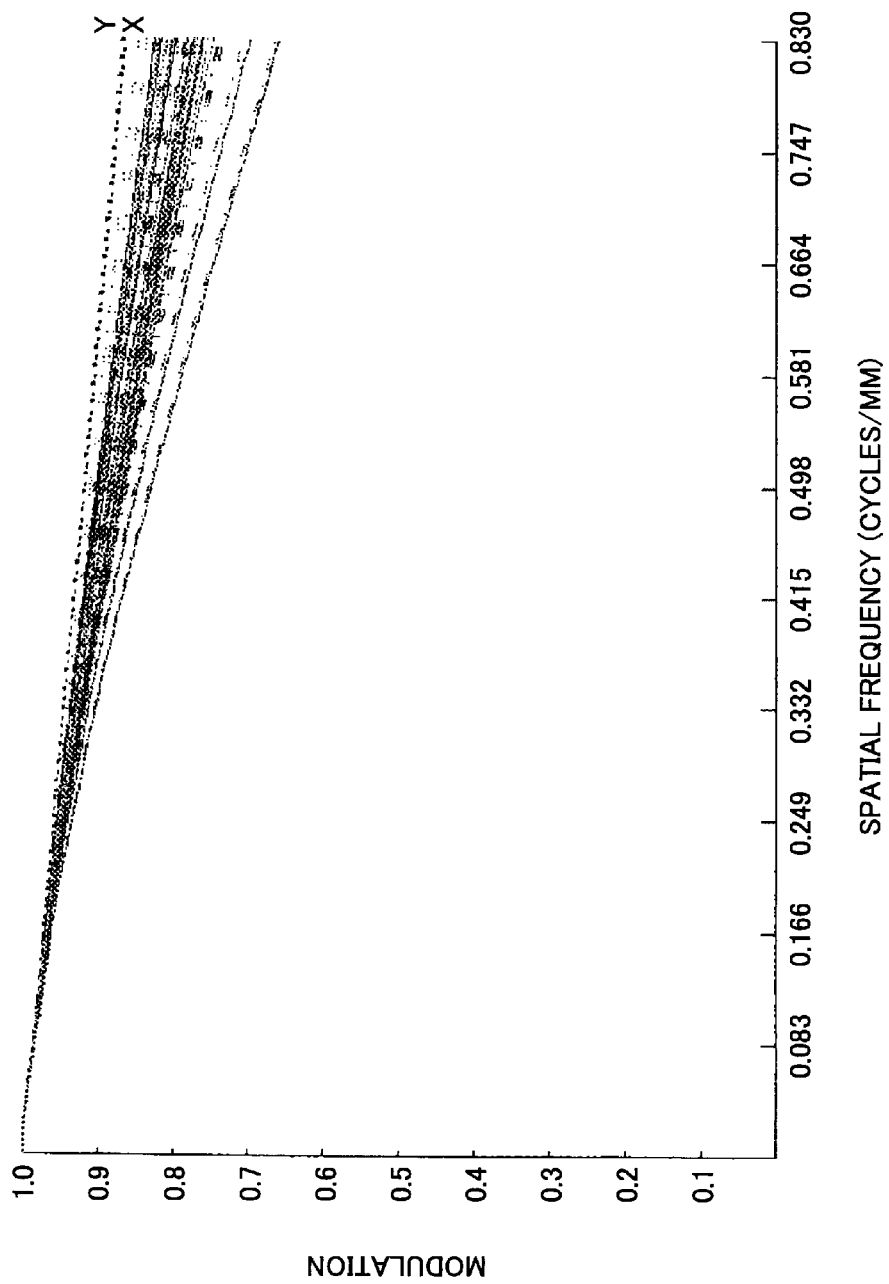
FIG. 2 is a diagram showing MTF characteristics in wave optics in specific numerical example 1 according to the first embodiment in FIG. 1.

FIG. 2 is a diagram showing MTF characteristics in wave optics in specific numerical example 1.

An axis of abscissas indicates spatial frequency (cycles/mm) and an axis of ordinates indicates modulation values. In other words, the axis of ordinates indicates MTF in ratio and a maximum value: 1 indicates that MTF is 100%. A spatial frequency: 0.83 cycles/mm in FIG. 2 is a frequency corresponding to one line pair in QXGA from magnification of the projection optical system and indicates resolution exceeding 65%.

Figure 3:
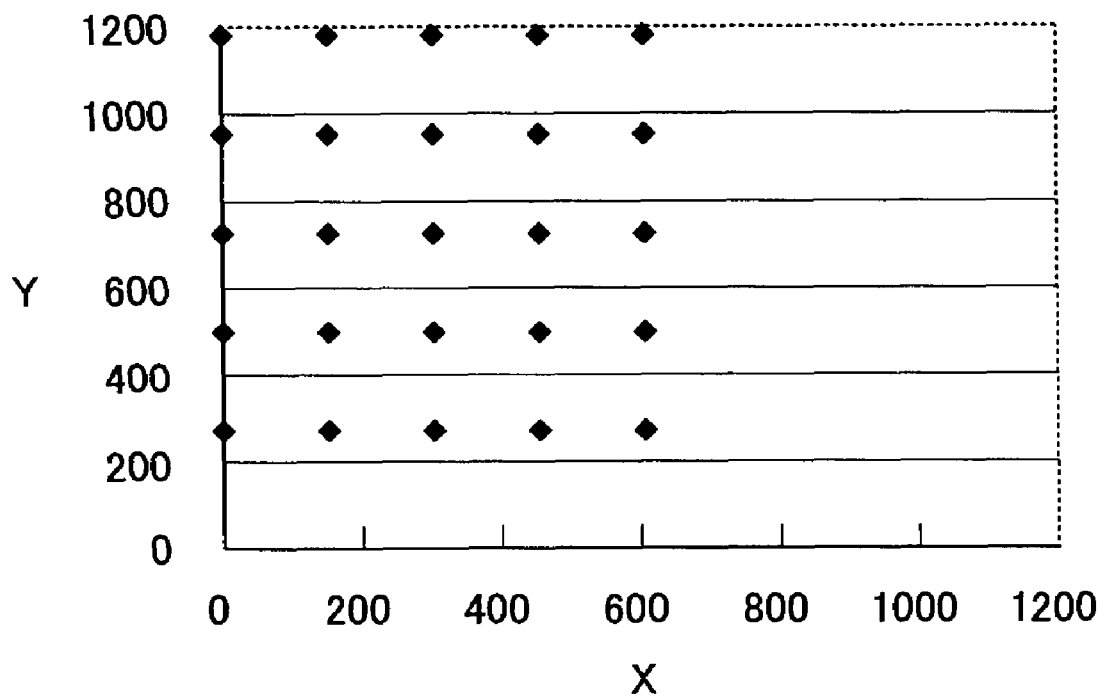
FIG. 3 is a diagram showing light-concentrated positions of an image in an image surface (screen surface) of numerical example 1.

FIG. 3 is a diagram showing light-concentrated positions of an image in an image surface (screen surface) of numerical example 1. A Y direction in an axis of ordinates indicates an upward and downward direction in FIG. 1 and an X direction in an axis of abscissas indicates a direction orthogonal relative to FIG. 1. As mentioned above, since the light fluxes reflected on the mirror 4 are reflected on the plane mirror having the reflection surface in parallel with an X-Y plane and are projected onto the screen (display unit), the image surface (screen) is in parallel with the X-Y plane. X=Y=0 is coordinates of an optical axis position of the lens system.

Although FIG. 3 shows only those image points in a +X direction relative to X=0 in the image surface, image points are symmetrically positioned in a −X direction relative to the Y axis as the projection optical system is bilaterally symmetric relative to the Y axis. As understood from FIG. 3, distortion is corrected in an extremely preferable manner. Specifically, TV distortion value in numerical example 1 is not more than ±0.5%.

Figure 4:
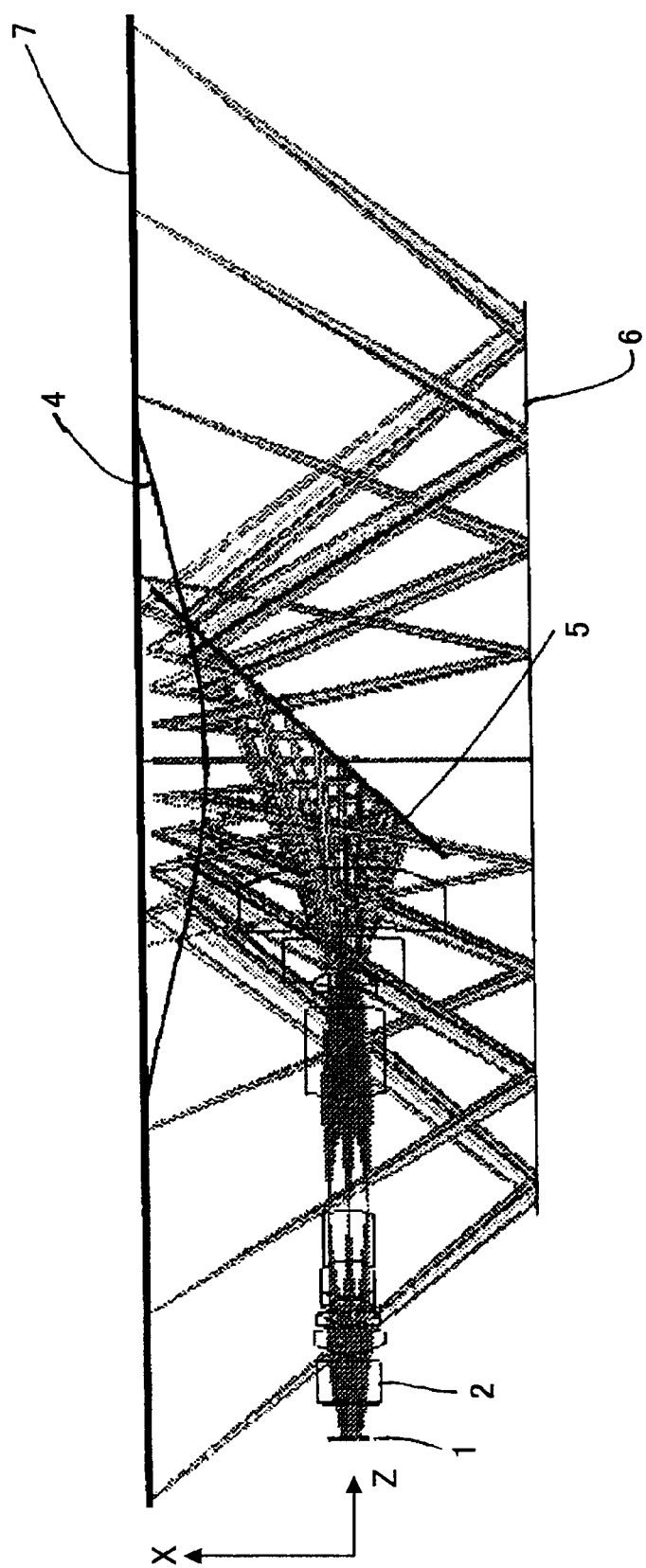
FIG. 4 is a diagram showing a variation (second embodiment) of the first embodiment in FIG. 1.

FIG. 4 is a diagram showing a second embodiment (variation of the first embodiment shown in FIG. 1). In the present embodiment, the lens system and the catoptric system are the same as in the first embodiment shown in FIG. 1. However, a mirror 5 for flexing optical path is disposed between the lens system and the mirror 4 (mirror closest to the lens system) of the catoptric system.

Reference numeral 6 in FIG. 4 indicates a plane mirror constituting the catoptric system with the mirror 4 and reference numeral 7 indicates a screen as an image display unit.

Reference numeral 1 indicates the object surface and reference numeral 2 indicates, in the same manner as in the first embodiment shown in FIG. 1, "a system configured by combining a polarization beam splitter for guiding a light from a light source to each light valve with a cross prism for integrating light fluxes reflected on each light valve" as a transparent plate having an optical path length equivalent relative to the system.

A light from the object surface 1 passes through the lens system. The light passed though the lens system is reflected on the mirror 5 for flexing optical path and is projected onto the mirror 4. The light projected onto the mirror 4 is reflected on a plane mirror 6 and an image is formed on a screen 7. The mirror 5 for flexing optical path is a plane mirror and is disposed such that a normal line of a reflection surface of the plane mirror is tilted by 45 degrees relative to a Z direction in a plane in parallel with an X-Z plane.

Figure 5:
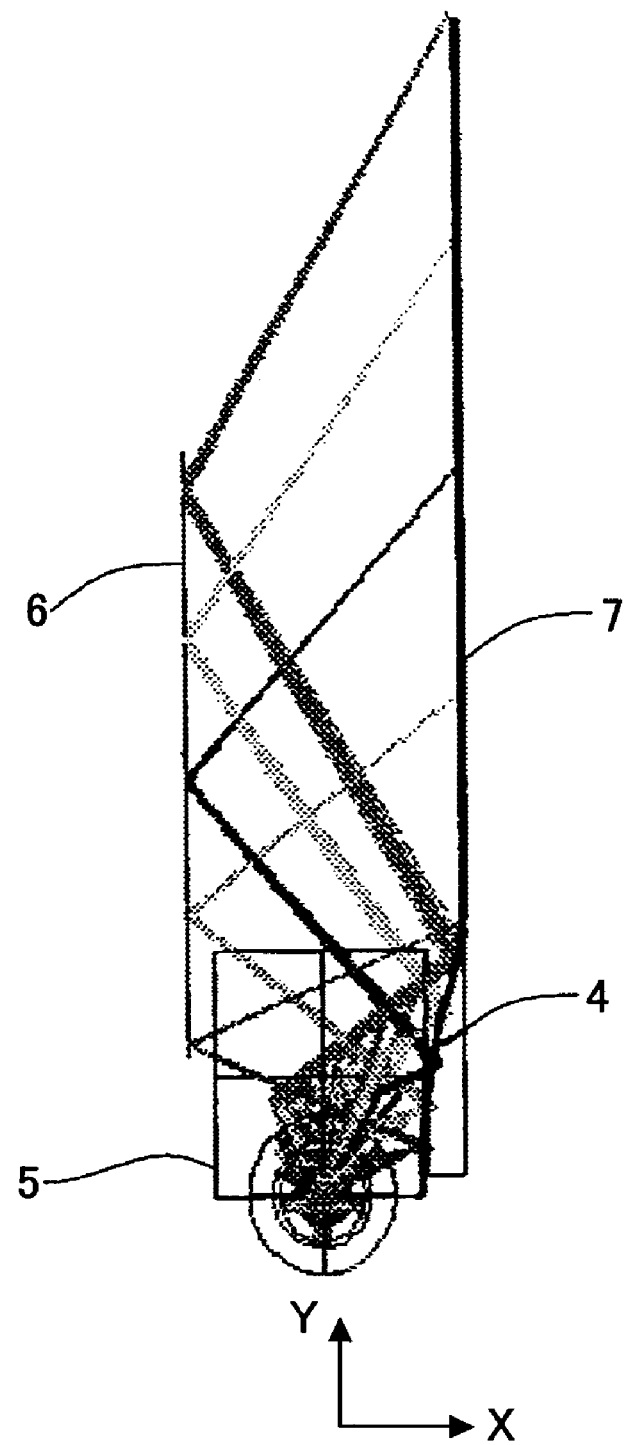
FIG. 5 is a diagram showing the variation in FIG. 4 when viewed from a direction parallel with an image surface.

FIG. 5 is an X-Y plan view showing the second embodiment shown in FIG. 4 when viewed from the Z direction. The light is reflected successively on the plane mirror 5, the mirror 4 having the mirror surface of a rotationally-symmetric aspherical shape, and the plane mirror 6, thereby reaching the screen 7. Through the reflection, a height of the light is increased in a +Y direction.

The plane mirror 5 has no effect other than the optical path flexure, so that when data on the catoptric system of FIG. 4 is the same as in the data in numerical example 1, the MTF characteristics in wave optics are the same as shown in FIG. 2 and light-concentrated positions of an image in the image surface (in parallel with a Y-Z plane) are the same as those shown in FIG. 3. However, the optical axis direction is changed in an X axis direction by the mirror 5, so that a lateral direction of the screen is changed in a Z axis direction.

In the embodiment as shown in FIGS. 4 and 5, the lens system is disposed between the mirror 4 and the plane mirror 6 and the optical axis of the lens system is in parallel with the reflection surface of the plane mirror 6. Thus, it is possible to have a smaller space between the plane mirror 6 and the screen 7 in comparison with the embodiment shown in FIG. 1 and it is possible to have a further reduced depth for an apparatus when the embodiment is constructed as a rear-projection image display apparatus. A space between the plane mirror 6 and the screen 7 in the X direction is about 300 mm. When the embodiment without the plane mirror 6 is constructed as a front-projection image display apparatus, it is possible to perform sufficient enlargement and projection while the apparatus is disposed closely to the screen.

Figure 6:
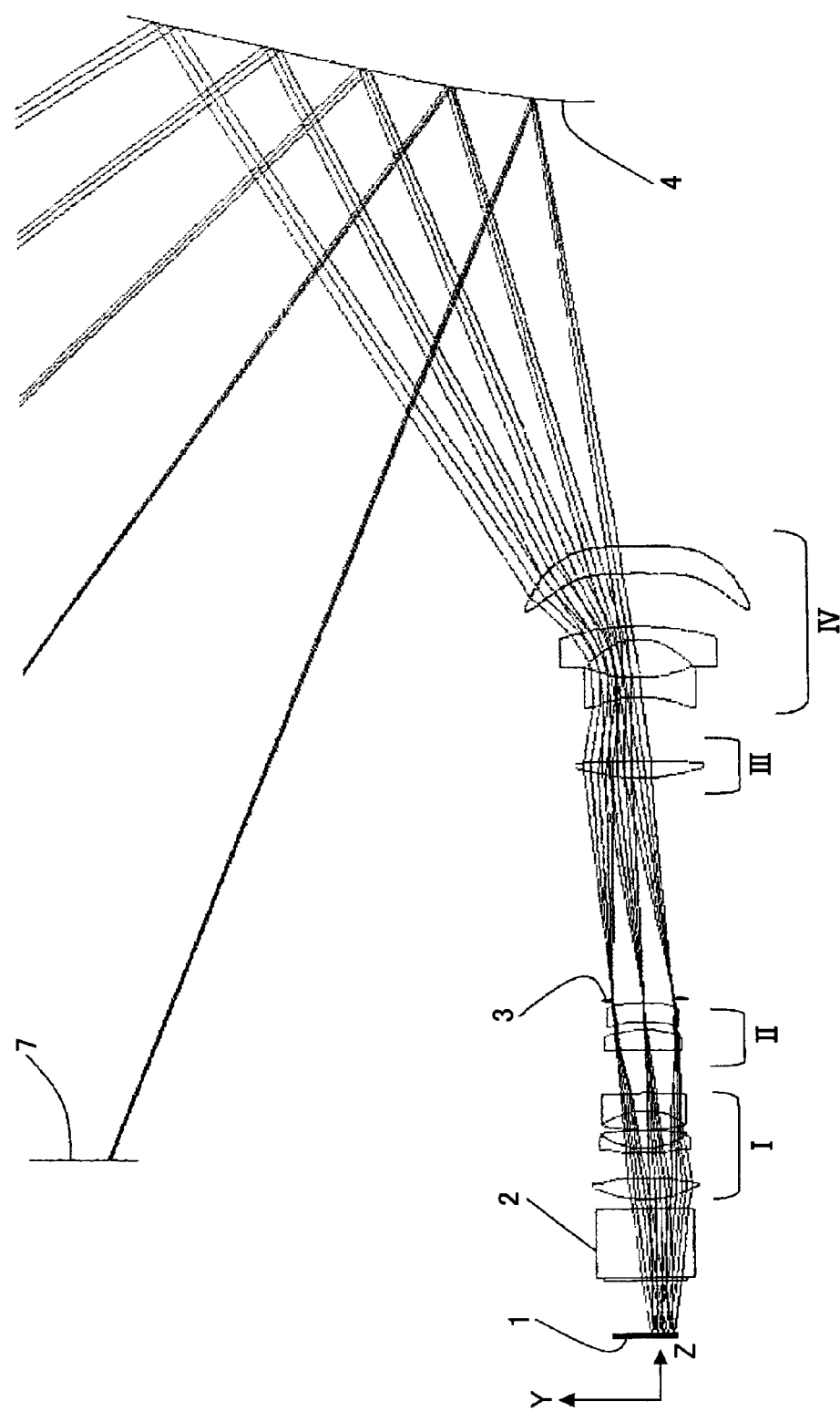
FIG. 6 is a diagram showing a projection optical system according to a third embodiment of the present invention.

FIG. 6 is a diagram showing a projection optical system according to a third embodiment of the present invention. The same reference numerals as in FIG. 1 are given to the same elements or portions so as to avoid complicating description.

As shown in FIG. 6, a light from the object surface 1 is projected onto the lens system via the transparent plate 2 having an optical path length equivalent relative to "a system configured by combining a polarization beam splitter for guiding a light from a light source to each light valve with a cross prism for integrating light fluxes reflected on each light valve". In the lens system, the first lens group I to the fourth lens group IV are coaxially disposed.

The light emitted from the lens system is projected onto the mirror 4 having negative power and constituting the catoptric system and the projected light is reflected on the mirror 4, so that an image is formed on the screen 7 as a display unit.

In the third embodiment shown in FIG. 6, lenses are configured to be thin in comparison with the embodiment in FIG. 1. The object surface 1 is an image display surface of a reflective light valve. An object height, namely, an active area in the Y direction of the object surface 1 is set as an area in a lower portion of the object surface 1 relative to the optical axis of the lens system and a center of the object surface 1 is shifted to a minus side of the Y direction relative to the optical axis of the lens system.

In the embodiment of FIG. 6, the first lens group I of the lens system has telecentricity on the object surface side and power thereof is 0.0103. Power of the second lens group II is 0.0086 and power of the third lens group III is 0.0094. In other words, the first lens group I to the third lens group III have positive power. In the fourth lens group IV, integrated power without a lens disposed closest to the image side is −0.04, namely, negative. The lens disposed on closest to the image side is a meniscus lens convex relative to the image side. As described above, the first lens group I to the fourth lens group IV are coaxially disposed.

The diaphragm 3 is disposed between the second lens group II and the third lens group III. Principal rays of different angles of view cross the optical axis at the diaphragm 3 and a height of marginal rays corresponds to a diameter of the diaphragm.

The mirror 4 included in the catoptric system has negative power and an optical axis thereof corresponds to the optical axis of the lens system without eccentricity.

In the present embodiment, the mirror surface of the mirror 4 has a rotationally-symmetric aspherical shape including even terms and odd terms as aspherical coefficients. As shown in FIG. 6, in the first lens group I, two pairs of cemented lenses are disposed on the object side relative to the diaphragm 3.

In other words, the projection optical system shown in FIG. 6 includes the lens system having, from the object side, the first lens group I providing telecentricity to the object space side, the second lens group II controlling divergence of angles of view, the diaphragm 3, the third lens group III converging the angles of view, and the fourth group IV converging and subsequently enlarging the angles of view, and the catoptric system disposed on the image side relative to the lens system and including the mirror 4 having negative power. Each lens group of the lens system and the mirror 4 share the optical axis and the optical axis is shifted relative to a center of the object surface 1.

The projection optical system shown in FIG. 6 is a projection optical system for projecting an image displayed in a planar manner as an object and forming an enlarged image of the object. The projection optical system includes the lens system having the four of the first lens group I to the fourth lens group IV and the catoptric system including the mirror 4 having negative power. Each lens group of the lens system and the mirror 4 having negative power share the optical axis. The diaphragm 3 is disposed in the lens system. The object side of the lens system is substantially telecentric and the optical axis is shifted relative to the center of the object surface 1. In the lens system, the first lens group I to the fourth lens group IV are disposed sequentially from the object side and the first lens group I to the third lens group III have positive power. In the fourth lens group IV, integrated power without the lens disposed closest to the image side is negative and the lens disposed closest to the image side has a meniscus shape convex relative to the image side. The diaphragm 3 is disposed between the second lens group II and the third lens group III. In the first lens group I positioned on an object side relative to the diaphragm 3, two pairs of cemented lenses are disposed.

Moreover, the mirror surface of the mirror 4 with negative power in the catoptric system has a rotationally-symmetric aspherical shape including even terms and odd terms.

In the following, a specific numerical example according to the third embodiment shown in FIG. 6 is described.

NUMERICAL EXAMPLE 2

Table 5 shows data on numerical example 2.

In Table 5, "No." is the surface number from the object side including both sides of the transparent plate referenced at reference numeral 2 and the surface of the diaphragm 3. No. 0 indicates the object surface and No. 15 indicates the surface of the diaphragm 3. R indicates radius of curvature, D indicates the space between surfaces, Nd indicates the refractive index of the material relative to d line, and νd indicates an Abbe number.

TABLE 5

| No. | R | D | Nd | νd | Note |
|---|---|---|---|---|---|
| 0 | 0.00 | 27.25 | | | Object surface |
| 1 | 0.00 | 36.90 | 1.517 | 64.1 | |
| 2 | 0.00 | 4.85 | | | |
| 3 | 54.58 | 10.39 | 1.497 | 81.6 | |
| 4 | −147.70 | 13.48 | | | |
| 5 | 203.76 | 1.60 | 1.786 | 44.2 | |
| 6 | 35.18 | 9.55 | 1.497 | 81.6 | |
| 7 | −145.33 | 0.10 | | | |
| 8 | 97.12 | 9.45 | 1.497 | 81.6 | |
| 9 | −35.54 | 9.18 | 1.834 | 37.1 | |
| 10 | −420.49 | 21.96 | | | |
| 11 | −1041.30 | 9.83 | 1.620 | 36.3 | |
| 12 | −63.98 | 4.07 | | | |
| 13 | −58.69 | 10.00 | 1.488 | 70.4 | |
| 14 | −67.20 | 114.08 | | | |
| 15 | 0.00 | 112.59 | | | Diaphragm |
| 16 | 96.14 | 8.32 | 1.773 | 49.6 | |
| 17 | −566.01 | 32.52 | | | |
| 18 | −66.68 | 10.00 | 1.603 | 60.5 | |
| 19 | 69.00 | 18.95 | | | |
| 20 | −32.64 | 7.06 | 1.696 | 36.2 | |
| 21 | −134.35 | 27.11 | | | |
| 22 | 0.00 | 13.75 | 1.492 | 57.8 | Aspherical surface |
| 23 | 0.00 | 58.88 | | | Aspherical surface |
| 24 | −133.33 | −274.16 | | | Aspherical surface |
| 25 | 0.00 | 300.00 | | | Reflection surface |
| 26 | 0.00 | | | | Image surface |

Table 6 shows data on the aspherical surface of No. 22 (lens surface on the object side of the lens disposed closest to the image side in the fourth lens group IV).

TABLE 6

| Aspherical surface (No. 22) | | | | |
|---|---|---|---|---|
| K | A4 | A6 | A8 | A10 |
| −4386.3 | −3.53E−6 | 1.11E−10 | 2.21E−13 | −3.08E−17 |

Table 7 shows data on the aspherical surface of No. 23 (lens surface on the image side of the lens disposed closest to the image side in the fourth lens group IV).

TABLE 7

| Aspherical surface (No. 23) | | | | |
|---|---|---|---|---|
| K | A4 | A6 | A8 | A10 |
| −3711.15 | −3.32E−6 | 3.97E−10 | −6.79E−14 | −3.47E−18 |

Table 8 shows data on the aspherical surface of No. 24 (mirror surface of the mirror 4)

TABLE 8

| Aspherical surface (No. 24) | |
|---|---|
| K | −1.01 |
| A1 | −10.76 |
| A2 | −1.10E−01 |
| A3 | 2.06E−05 |
| A4 | −1.30E−07 |
| A5 | 4.17E−10 |

TABLE 8-continued

Aspherical surface (No. 24)

| A6 | −7.04E−13 |
| A7 | 4.98E−16 |
| A8 | −6.80E−21 |

In addition, No. 25 in Table 1 indicates the reflection surface of the plane mirror (constituting the catoptric system along with the mirror 4 and not shown in FIG. 6) for reflecting light fluxes reflected on the mirror 4 to the screen side.

In the projection optical system according to specific numerical example 2, as described above, at least one aspherical surface (No. 22, 23) are included in the lens system, namely, two aspherical surfaces are disposed in the lens system. Both sides (No. 22, 23) of the lens (meniscus lens convex relative to the image side) disposed closest to the image side in the fourth lens group IV are aspherical surfaces. Further, the lens disposed closest to the image side in the fourth lens group IV is made of synthetic resin.

In numerical example 2, magnification is 85.7 times and when a reflective light valve having a diagonal length of 0.7 inches is used, it is possible to enlarge and project an image onto a screen having a diagonal length of 60 inches.

Light fluxes shown in FIG. 6 are displayed based on five angles of view of 0.0, 0.25, 0.5, 0.75, and 1.0 in the object-height ratio in the −Y direction in FIG. 6 from the position closest to the optical axis as a base point in the object surface 1.

Figure 7:
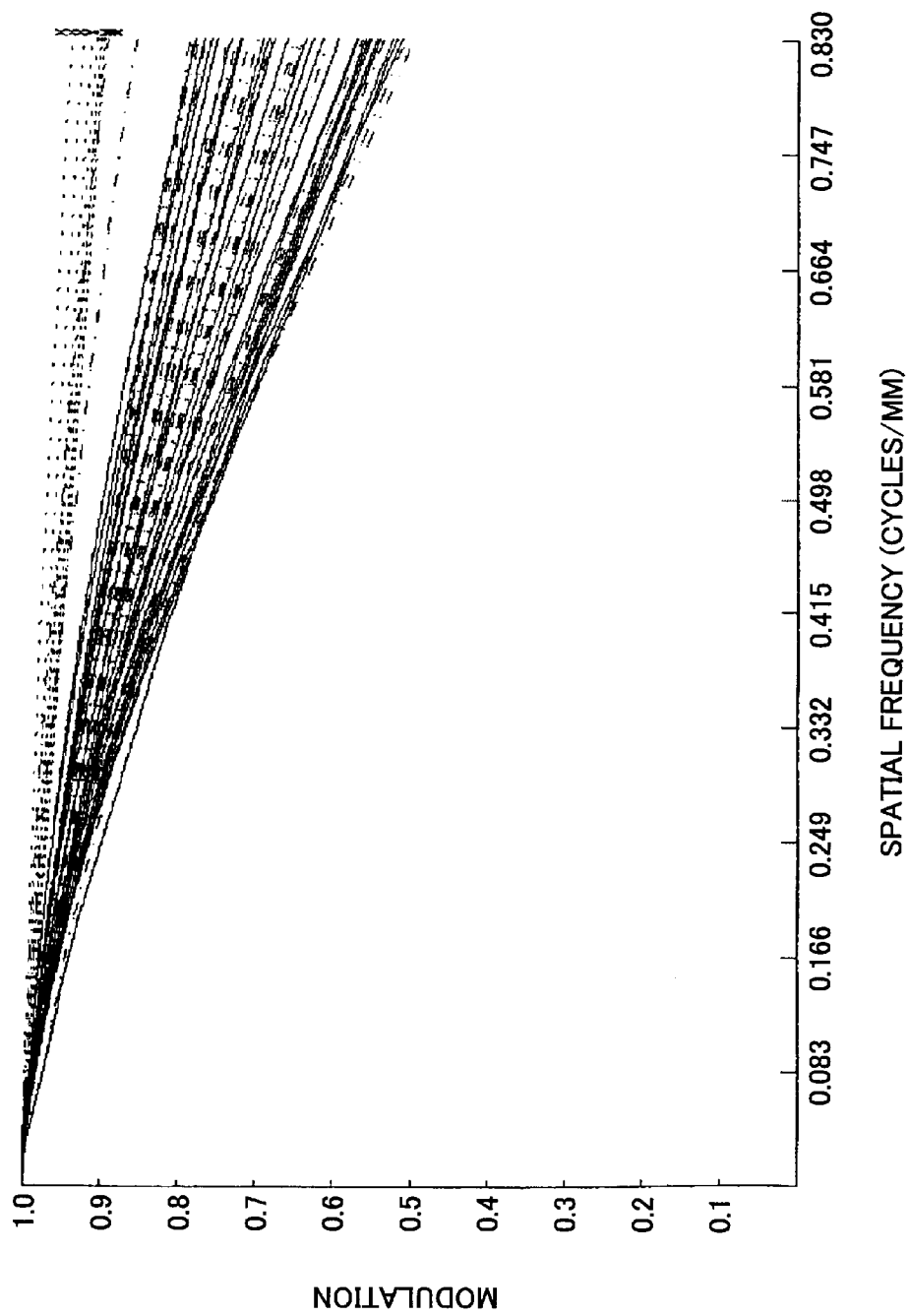
FIG. 7 is a diagram showing MTF characteristics in wave optics in specific numerical example 2 according to the third embodiment in FIG. 6.

FIG. 7 is a diagram showing MTF characteristics in wave optics in specific numerical example 2 following FIG. 2.

An axis of abscissas indicates spatial frequency (cycles/mm) and an axis of ordinates indicates modulation values. A spatial frequency: 0.83 cycles/mm in FIG. 7 is a frequency corresponding to one line pair in QXGA from magnification of the projection optical system and indicates resolution exceeding 50%.

Figure 8:
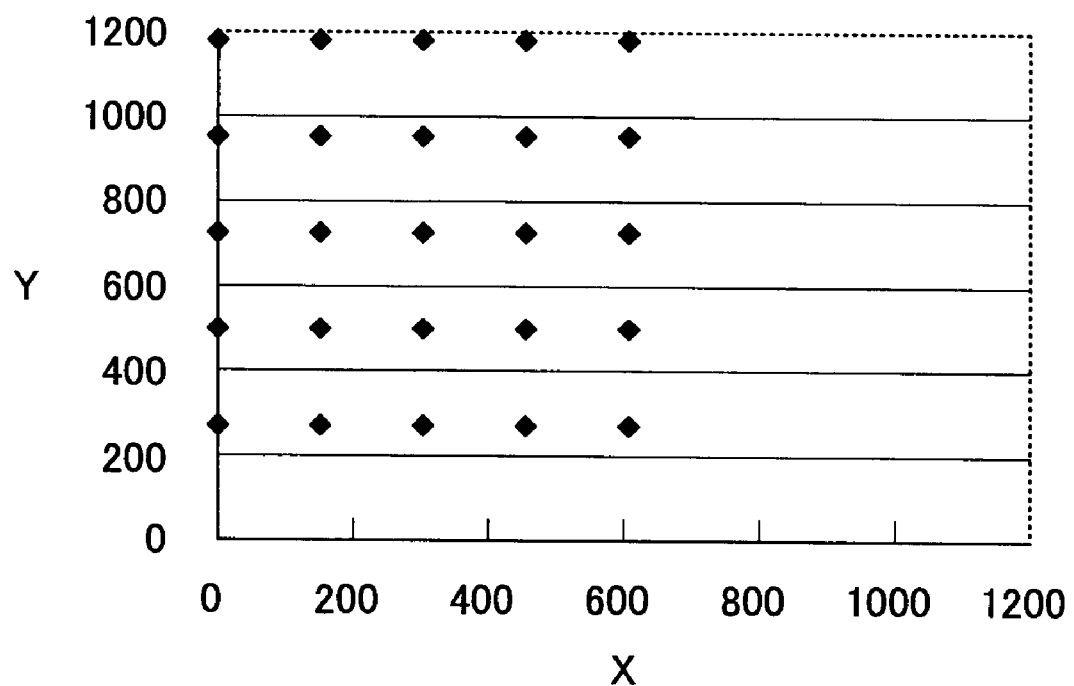
FIG. 8 is a diagram showing light-concentrated positions of an image in the image surface (screen surface) of numerical example 1.

FIG. 8 is a diagram showing light-concentrated positions of an image in the image surface 7 (screen surface) of numerical example 2. A Y direction in an axis of ordinates indicates an upward and downward direction in FIG. 6 and an X direction in an axis of abscissas indicates a direction orthogonal relative to FIG. 6. As mentioned above, since the light fluxes reflected on the mirror 4 are reflected on the plane mirror having the reflection surface in parallel with an X-Y plane and are projected onto the screen (display unit), the image surface (screen) is in parallel with the X-Y plane. X=Y=0 is coordinates of an optical axis position of the lens system.

Although FIG. 8 shows only those image points in a +X direction relative to X=0 in the image surface, image points are symmetrically positioned in a −X direction relative to the Y axis as the projection optical system is bilaterally symmetric relative to the Y axis. As understood from FIG. 8, distortion is corrected in an extremely preferable manner. Specifically, TV distortion value in numerical example 2 is not more than ±0.5%.

In the same manner as in the variation (second embodiment) shown in FIGS. 4 and 5, in the third embodiment shown in FIG. 6, between the lens system and the mirror 4 having a rotationally-symmetrical aspherical surface, the same mirror (plane mirror) for flexing optical path as the mirror 5 shown in FIG. 4 is disposed such that a normal line of a reflection surface of the plane mirror is tilted by 45 degrees relative to a Z direction (optical axis direction of the lens system) in a plane in parallel with a Y-Z plane. In accordance with this, it is possible to realize the same structure as in the variation (second embodiment) shown in FIGS. 4 and 5.

In this case, an optical axis of the mirror 4 corresponds to the X direction orthogonal relative to FIG. 6. A light passing through the lens system is reflected on the mirror for flexing optical path in the X direction, reflected on the mirror 4 in a −X direction, and reflected again on the plane mirror, thereby reaching the screen 7. In this case, it is also possible to set a distance between the plane mirror and the screen 7 in the X direction to be about 300 mm. The light is reflected successively on the mirror for flexing optical path, the mirror 4, and the plane mirror 6, thereby reaching the screen 7. Through the reflection, a height of the light is increased in a +Y direction The mirror for flexing optical path has no refraction effect, so that when data on the catoptric system of FIG. 6 is the same as in the data in numerical example 2, the MTF characteristics in wave optics are the same as shown in FIG. 7 and light-concentrated positions of an image in the image surface (in parallel with a Y-Z plane) are the same as those shown in FIG. 8. However, the optical axis direction is changed in an X axis direction by the mirror 5 for flexing optical path, so that a lateral direction of the screen is changed in a Z axis direction.

In this embodiment, the lens system is also disposed between the mirror 4 and the plane mirror 6 and the optical axis of the lens system is in parallel with the reflection surface of the plane mirror 6. Thus, it is possible to have a smaller space between the plane mirror 6 and the screen 7 in comparison with the embodiment shown in FIG. 1 and it is possible to have a further reduced depth for the apparatus when the embodiment is constructed as a rear-projection image display apparatus. When the embodiment without the plane mirror 6 is constructed as a front-projection image display apparatus, it is possible to perform sufficient enlargement and projection while the apparatus is disposed closely to the screen.

In both numerical examples 1 and 2 (including the variation) of the above-mentioned projection optical system, the projection optical system has at least the lens system including the four lens groups and the catoptric system following the lens system, the catoptric system including one mirror having negative power. The optical axis of the lens system is shifted relative to the center of the object surface 1 and the object surface of the lens system is telecentric. The object surface 1 is the image display surface of the reflective light valve and the image surface is the screen. The first lens group I closest to the light valve contributes to telecentricity.

The first lens group I also provides an achromatic effect.

The second lens group II constituted using two lenses in numerical examples 1 and 2 (including the variation) provides "an effect of controlling an increase of angles of view so as to have positive power", so that an increase of lens aperture is controlled from the third lens group III. The diaphragm 3 is disposed on an image side of the second lens group II, where principal rays cross the optical axis and a height of marginal rays is arranged.

The third lens group III provides positive power, inflects and brings the marginal rays close to the optical axis so as to control the increase of angles of view, controls a projection height of the rays incident on the fourth lens group IV to be low, and contributes to reduction of a lens diameter of the fourth lens group IV.

In the fourth lens group IV, the angles of view are increased through a lens disposed closest to the object side and providing negative power and following two lenses also contribute to the increase of the angles of view. Although power of the vicinity of the optical axis of the lens (meniscus lens convex relative to the image side) disposed closest to the image side in the fourth lens group IV is substantially zero in numerical examples 1 and 2 (including the variation), light fluxes for image formation do not pass through the vicinity of the optical axis. An area of the meniscus lens where the light fluxes pass through has a convex meniscus shape.

To the image side relative to the fourth lens group IV, the mirror 4 having an axisymmetric and convex shape is disposed and curvature of field at a screen potion is corrected. In other words, an image is overexposed in the lens system and the image is underexposed in the mirror 4 for cancellation, so that the image is flat on the screen surface. Further, the fourth lens group IV and the mirror 5 for flexing optical path correct magnification and distortion.

In numerical examples 1 and 2 (including the variation), the center of the object surface 1 as an image display surface of the light valve is shifted relative to the optical axis of the lens system and all light fluxes emitted from the light valve pass through one side of the optical axis (below the optical axis in FIGS. 1 and 6) in the first lens group I of the lens system.

In the diaphragm 3, principal rays of each angle of view cross the optical axis. In the third lens group III, the light fluxes passing through an upper portion of the lens system relative to the center thereof are increased. In the fourth lens group IV, almost all the light fluxes of image formation pass above the optical axis. The light emitted from the fourth lens group IV and directed to the mirror 4 having a rotationally-symmetric aspherical surface is diagonally right up when a traveling direction of the light is right.

In the mirror 4, all the light fluxes are reflected on a portion above the optical axis and principal rays of the light reflected on the mirror 4 are diagonally left up when a traveling direction of the reflected light is left. In this manner, the light reflected on the mirror 4 is capable of setting the image surface above the optical axis without being obstructed by the fourth lens group IV while being guided to the screen 7.

The projection optical system is telecentric on the light valve side and has a long back focal distance. Thus, the projection optical system is capable of perpendicularly irradiating an illumination light onto a reflective light valve such as LCOS via a polarization beam splitter and guiding the reflected light from the light valve to the projection optical system via the polarization beam splitter and a cross prism for integrating colors.

By arranging power of the projection optical system as mentioned above, it is possible to enlarge a ratio of the back focal distance on the light valve to a focal distance of an entire system, namely, a "retro ratio", in which the above-mentioned polarization beam splitter and the cross prism are disposed between the lens system and the light valve.

Further, by having positive power in the third lens group III, a direction of the principal rays is directed to the optical axis and a height of the light fluxes for image formation incident on the fourth lens group IV is reduced, so that a diameter of the lenses in the mirror 4 is reduced.

In the projection optical system of numerical examples 1 and 2 (including the variation), a space in which at least one mirror for flexing optical path can be disposed is present between the lens system and the mirror 4. In the variation, one plane mirror is disposed between the lens at the end of the fourth lens group IV and the mirror 4 such that the plane mirror is tilted by 45 degrees relative to the optical axis and the optical axis of the lens system is set in parallel with the screen surface or in a relatively close direction. By disposing in this manner, it is possible to reduce a length of the optical system in the normal line direction of the screen 7 and reduce a depth of an apparatus upon constructing a rear-projection image display apparatus.

The mirror surface of the mirror 4 of examples 1 and 2 (including the variation) is a rotationally-symmetric aspherical surface and the curvature of field is corrected by changing curvature in a portion close to the optical axis and the vicinity thereof and relaxing the curvature of the vicinity so as to increase an image distance. Moreover, the lens system and the mirror 4 are coaxially disposed, so that the optical axis is readily adjusted. The rotationally-symmetric aspherical surface of the mirror 4 includes even terms and odd terms, so that an effect of aberration correction is improved in comparison with a case where only those even terms are included. Thus, distortion is readily corrected in comparison with the case where only those even terms are included.

In the case of the rear-projection image display apparatus, although TV distortion is likely to be noticeable and has an influence on performance thereof, it is effective to use odd terms so as to improve the performance. In the aspherical surface shape including odd terms, it is readily possible to realize an aspherical surface in which a position close to the optical axis has a large curvature and the vicinity thereof has a relaxed curvature especially from effects of a first term and a third term.

Further, positive power is arranged from the first lens group I to the second lens group II, a position where principal rays of each angle of view cross the optical axis is disposed between the second lens group II and the third lens group III, and an optical path is realized such that heights of marginal rays substantially correspond to one another. By disposing the diaphragm 3 on the position, a vignetting factor not less than 80% is achieved.

Moreover, when object side lens groups (the first lens group I and the second lens group II) relative to the diaphragm 3 and screen side lens groups (the third lens group III and the fourth lens group IV) relative to the diaphragm 3 are compared, difference of heights when light fluxes of different angles of view pass through the lenses is smaller on the light valve side and difference from angles of view of a refraction effect received in the lens surface is smaller. In numerical examples 1 and 2, the cemented lens is disposed on the light valve side relative to the diaphragm 3 so as to realize an arrangement capable of selectively correcting chromatic difference of magnification and curvature of field while reducing an influence on magnification of an image.

By contrast, when the cemented lens is disposed on the screen side relative to the diaphragm 3 so as to correct chroma aberration, a light passing through the cemented lens is likely to have a large difference of height from angles of view and a large difference from angles of view of a refraction effect received in the lens surface. Thus, correction of chromatic aberration and magnification correction tend to conflict with each other at the cemented lens position, so that it is difficult to have a preferable answer.

In numerical examples 1 and 2 (including the variation), in accordance with the above-mentioned power arrangement, light fluxes of each angle of view are separated and pass through the lenses in the fourth lens group IV. In a position where a light flux of a specific angle of view passes through, light fluxes of other angles of view do not pass through the lens. By using an aspherical surface for an area where light fluxes of different angles of view are separated in this manner, magnification of an image and correction of distortion are effectively performed with the aspherical surface shape of the mirror 4.

In both numerical examples 1 and 2, both surfaces of the meniscus lens are aspherical surfaces, the meniscus lens being convex relative to the image side and disposed closest to the image side in the fourth lens group IV. As shown in FIGS. 1 and 6, in this meniscus lens, the heights of light fluxes are spaced in accordance with angles of view, so that it is possible to correct aberration in each angle of view by using an aspherical surface for the surface of the meniscus lens. Thus, it is possible to correct aberration necessary for the lens system using only two aspherical surfaces without using the aspherical surface for other lens surfaces. Further, it is possible to use resin materials for the lens disposed closest to the image side in the fourth lens group IV, so that it is possible to reduce a molding and processing cost in comparison with a case where glass is used.

Figure 9:
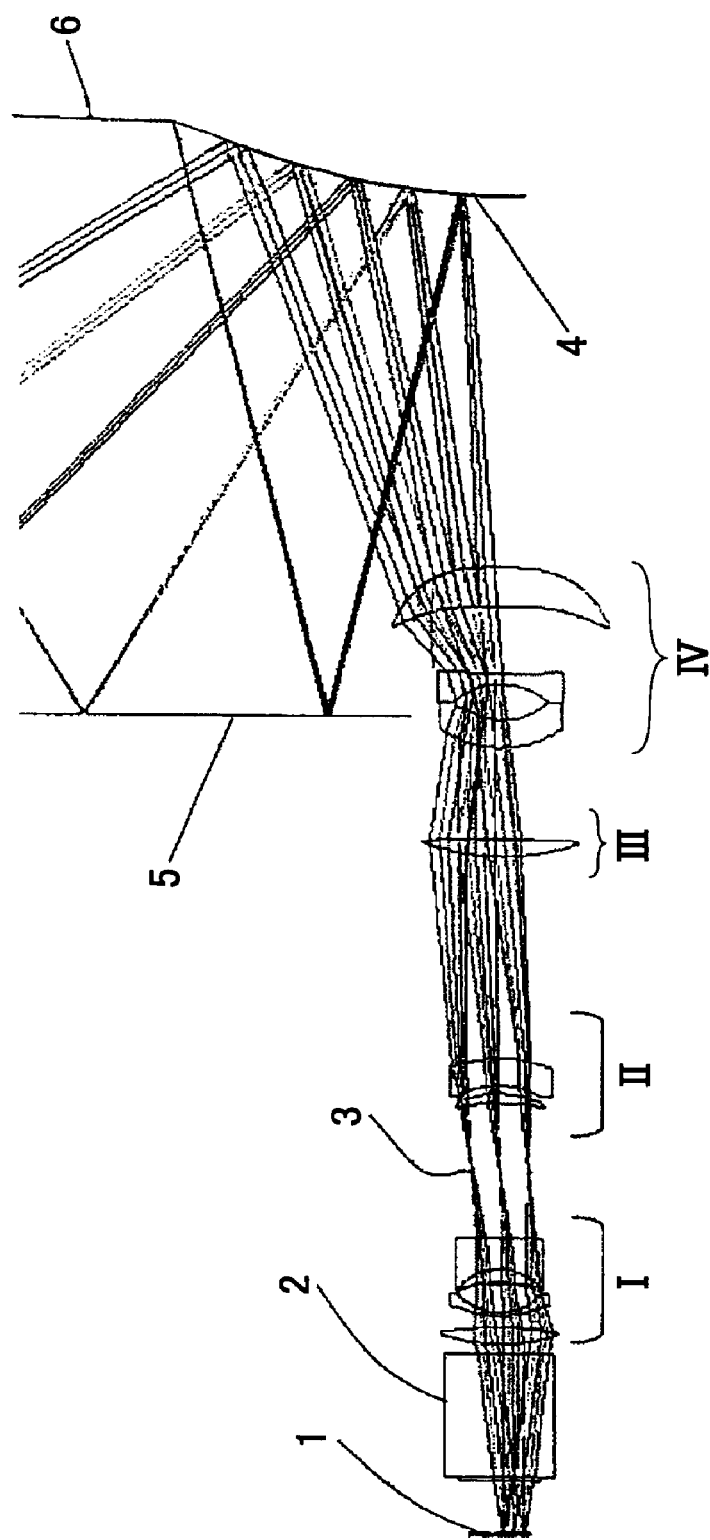
FIG. 9 is a diagram showing a projection optical system according to a fourth embodiment of the present invention.

FIG. 9 is a diagram showing a projection optical system according to a fourth embodiment of the present invention.

The same reference numerals as in the above-mentioned embodiment are given to the same elements or portions and description in terms of structure, function, and characteristics are omitted as appropriate unless necessary. Difference from the above-mentioned embodiments in terms of structure is a shape of each lens group and the position of the diaphragm 3.

The projection optical system shown in FIG. 9 includes the lens system having, from the object side, the first lens group I providing telecentricity to the object space side, the diaphragm 3, the second lens group II controlling divergence of angles of view, the third lens group III converging the angles of view, and the fourth group IV converging and subsequently enlarging the angles of view, and the catoptric system disposed on the image side relative to the lens system and including the mirror 4 having negative power. Each group of the lens system and the mirror 4 having negative power are coaxially disposed and the optical axis is shifted relative to the center of the object surface 1. According to this structure, it is possible to reduce thickness and size of the image display apparatus.

The projection optical system shown in FIG. 9 is a projection optical system for projecting an image displayed in a planar manner as an object and forming an enlarged image of the object. The projection optical system includes the lens system having the four of the first lens group I to the fourth lens group IV and the catoptric system including the mirror 4 having negative power. Each lens group of the lens system and the mirror 4 having negative power share the optical axis. The diaphragm 3 is disposed in the lens system. The object side of the lens system is substantially telecentric and the optical axis is shifted relative to the center of the object surface 1. According to this structure, it is possible to reduce thickness and size of the image display apparatus.

In the lens system, the first lens group I to the fourth lens group IV are sequentially disposed from the object side and the first lens group I and the second lens group II have positive power. Integrated power from the third lens group III and the fourth lens group IV is negative and the diaphragm 3 is disposed between the first lens group I and the second lens group II. In this manner, because of the negative power of the mirror included in the catoptric system, a long back focal distance, and the telecentricity of the lens system on the object side, it is possible to obtain a projection optical system with a wide angle on the image side, a short projection distance, and high resolution, the projection optical system being capable of correcting distortion of an image even when obliquely projecting on the image surface. Further, by disposing the diaphragm 3 between the first lens group I and the second lens group II, it is possible to obtain a large vignetting factor.

In addition, as shown in FIG. 9, in the first lens group I positioned on an object side relative to the diaphragm 3, two pairs of cemented lenses are disposed. By disposing the cemented lenses on the object side relative to the diaphragm 3, it is possible to preferably correct chromatic difference of magnification.

Moreover, the mirror surface of the mirror 4 with negative power in the catoptric system has a rotationally-symmetric aspherical shape including odd terms. The rotationally-symmetric aspherical shape is readily formed, so that it is possible to reduce a manufacturing cost. Because of the aspherical surface having odd terms in addition to even terms, it is possible to preferably correct the image distortion accompanied by the wide angle and oblique projection.

In the lens system, the first lens group I to the fourth lens group IV may be disposed sequentially from the object side, the first lens group I to the third lens group III may have positive power, in the fourth lens group IV, integrated power without the lens disposed closest to the image side may be negative and the lens disposed closest to the image side may have a meniscus shape convex relative to the image side, and the diaphragm 3 may be disposed between the first lens group I and the second lens group II.

In the following, a specific numerical example according to the fourth embodiment shown in FIG. 9 is described.

NUMERICAL EXAMPLE 3

Tables 9, 10, and 11 show data on numerical example 3.

In Table 9, surface number is a number from the object surface including both sides of the transparent plate 2 in FIG. 9. Surface 1 (S0) indicates the object surface, surfaces 11 to 17 (S11 to S17) indicate the first lens group I, surface 19 (S19) indicates the diaphragm, surfaces 20 to 23 (S20 to S23) indicate the second lens group II, surfaces 24 to 25 (S24 to S25) indicate the third lens group III, surfaces 26 to 31 (S26 to S31) indicate the fourth lens group IV, surface 32 (S32) indicates an aspherical mirror, surface 33 (S33) indicates a plane mirror for returning, and surface 34 (S34) indicates the image surface. Surfaces 30, 31, and 32 indicate aspherical surfaces. "INF" indicates a plane. The above-mentioned description of Table 9 applies in the following tables (13, 17, 21, 25, 29, 33, 37, 41, 45, 49, 53, 57, 61, 65, 69, and 73) in the same manner.

TABLE 9

| Surface number | | Curvature radius (mm) | Space (mm) | Refractive index Nd | Abbe number vd |
|---|---|---|---|---|---|
| S0 | Panel | INF | 0.00 | | |
| S1 | | INF | 0.60 | 1.528 | 70.4 |
| S2 | | INF | 0.75 | | |
| S3 | | INF | 1.20 | 1.518 | 64.2 |
| S4 | | INF | 26.50 | | |
| S5 | | INF | 0.20 | 1.518 | 64.2 |
| S6 | | INF | 0.00 | | |
| S7 | | INF | 1.50 | 1.518 | 64.2 |
| S8 | | INF | 0.00 | | |
| S9 | | INF | 63.35 | 1.51822 | 64.2 |
| S10 | | INF | 4.85 | | |
| S11 | L1 | 76.506 | 8.99 | 1.8512 | 24.5 |
| S12 | | −172.906 | 5.74 | | |
| S13 | L2 | 58.308 | 1.50 | 1.8467 | 29.9 |
| S14 | L3 | 28.536 | 15.00 | 1.4979 | 78.9 |
| S15 | | −55.665 | 0.50 | | |
| S16 | L4 | −52.553 | 6.65 | 1.8294 | 39.4 |
| S17 | L5 | −26.970 | 15.00 | 1.8542 | 23.2 |
| S18 | | 570.462 | 35.16 | | |
| S19 | STOP | INF | 33.08 | | |
| S20 | L6 | −153.087 | 5.28 | 1.785 | 25.5 |

TABLE 9-continued

| Surface number | | Curvature radius (mm) | Space (mm) | Refractive index Nd | Abbe number vd |
|---|---|---|---|---|---|
| S21 | | −44.878 | 4.00 | | |
| S22 | L7 | −41.752 | 13.63 | 1.8394 | 41.9 |
| S23 | | −79.452 | 93.86 | | |
| S24 | L8 | 109.988 | 8.05 | 1.7284 | 64.7 |
| S25 | | −2387.836 | 47.92 | | |
| S26 | L9 | 51.010 | 14.31 | 1.6311 | 69.5 |
| S27 | | 34.331 | 17.39 | | |
| S28 | L10 | −37.268 | 5.00 | 1.8525 | 24.4 |
| S29 | | 285.969 | 37.98 | | |
| S30 | L11 | −6996.848 | 19.72 | 1.4915 | 57.8 |
| S31 | | −208.873 | 182.24 | | |
| S32 | Mirror 1 | 193.101 | −257.82 | | |
| S33 | Mirror 2 | INF | 300 | | |
| S34 | Image surface | INF | | | |

Table 10 shows aspherical coefficients of surface 30 and surface 32. Table 11 shows aspherical coefficients of surface 32.

TABLE 10

| | K | A | B | C | D | E |
|---|---|---|---|---|---|---|
| S30 | −1.00E+01 | −2.65E−06 | 5.16E−10 | 2.37E−15 | −4.51E−18 | −1.73E−22 |
| S31 | −1.62E+00 | −2.57E−06 | 3.88E−10 | −1.41E−13 | 2.61E−17 | −4.48E−21 |

TABLE 11

| | K | C1 | C2 | C3 | C4 | C5 | C6 | C7 | C8 |
|---|---|---|---|---|---|---|---|---|---|
| S32 | −9.87E−02 | 1.11E−03 | −4.65E−06 | 3.33E−06 | −3.13E−07 | 4.27E−09 | −3.42E−11 | 1.43E−13 | −2.51E−16 |

Table 12 shows values of a ratio of a focal distance f1 of the first lens group I of the lens system to a focal distance f of an entire lens system, a ratio of a focal distance f2 of the second lens group II of the lens system to the focal distance f of the entire lens system, and a ratio of an combined focal distance f3 of third lens group III and the fourth lens group IV of the lens system to the focal distance f of the entire lens system in the numerical example. These values satisfy the following conditional equations (1) to (3). The conditions enable thin projection and are advantageous for improving resolution capability. In other words, when these conditions are satisfied, the first lens group I is capable of correcting spherical aberration and curvature of field.

Further, the second lens group II is capable of achieving a function of controlling divergence of angles of view so as not to increase the size of the third lens group III. In accordance with this, it is possible to have a wide angle and reduce thickness for the third lens group III and the fourth lens group IV. And, it is possible to secure desired angles of view for the third lens group III and the fourth lens group IV without having an enlarged mirror for the catoptric system. In accordance with a synergistic effect resulting therefrom, it is possible to perform thin projection and improve the resolution capability. Moreover, the mirror in the catoptric system contributes to the wide angle and distortion correction.

$$2.7 < f1/f \quad (1)$$

$$f2/f < 8.8 \quad (2)$$

$$-9.4 < f3/f \quad (3)$$

TABLE 12

| f1/f | 2.744 |
|---|---|
| f2/f | 8.7 |
| f3/f | −9.399 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8.

In this case, even in a frequency corresponding to QXGA (0.84 cycles/mm), a white MTF value not less than 53% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm.

NUMERICAL EXAMPLE 4

Tables 13, 14, and 15 show data on numerical example 4.

TABLE 13

| Surface number | | Curvature radius (mm) | Space (mm) | Refractive index Nd | Abbe number vd |
|---|---|---|---|---|---|
| S0 | Panel | INF | 0.00 | | |
| S1 | | INF | 0.60 | 1.528 | 70.4 |
| S2 | | INF | 0.75 | | |
| S3 | | INF | 1.20 | 1.518 | 64.2 |
| S4 | | INF | 26.50 | | |
| S5 | | INF | 0.20 | 1.518 | 64.2 |
| S6 | | INF | 0.00 | | |
| S7 | | INF | 1.50 | 1.518 | 64.2 |
| S8 | | INF | 0.00 | | |
| S9 | | INF | 63.35 | 1.51822 | 64.2 |
| S10 | | INF | 4.85 | | |
| S11 | L1 | 76.129 | 9.03 | 1.8504 | 25.1 |
| S12 | | −175.455 | 6.02 | | |
| S13 | L2 | 57.833 | 1.50 | 1.8459 | 30.9 |
| S14 | L3 | 28.428 | 15.00 | 1.4974 | 77.2 |
| S15 | | −56.069 | 0.50 | | |
| S16 | L4 | −52.828 | 6.62 | 1.8291 | 39.3 |
| S17 | L5 | −27.068 | 15.00 | 1.8542 | 23.2 |
| S18 | | 525.203 | 35.21 | | |
| S19 | STOP | INF | 34.42 | | |

TABLE 13-continued

| Surface number | | Curvature radius (mm) | Space (mm) | Refractive index Nd | Abbe number vd |
|---|---|---|---|---|---|
| S20 | L6 | −155.221 | 5.42 | 1.7849 | 25.4 |
| S21 | | −44.988 | 4.04 | | |
| S22 | L7 | −41.753 | 13.70 | 1.8399 | 38.8 |
| S23 | | −79.314 | 104.56 | | |
| S24 | L8 | 110.113 | 8.64 | 1.7266 | 64.7 |
| S25 | | −2675.794 | 47.69 | | |
| S26 | L9 | 52.849 | 14.21 | 1.6382 | 69 |
| S27 | | 34.819 | 18.57 | | |
| S28 | L10 | −37.080 | 5.00 | 1.8522 | 24.6 |
| S29 | | 371.286 | 34.87 | | |
| S30 | L11 | −7006.770 | 20.00 | 1.4915 | 57.8 |
| S31 | | −209.505 | 180.44 | | |
| S32 | Mirror 1 | 192.911 | −257.01 | | |
| S33 | Mirror 2 | INF | 300.00 | | |
| S34 | Image surface | INF | | | |

Table 14 shows aspherical coefficients of surface 30 and surface 31. Table 15 shows aspherical coefficients of surface 32.

TABLE 14

| | K | A | B | C | D | E |
|---|---|---|---|---|---|---|
| S30 | −1.00E+01 | −2.63E−06 | 5.20E−10 | 2.56E−15 | −4.56E−18 | −2.16E−22 |
| S31 | −1.10E+00 | −2.58E−06 | 3.88E−10 | −1.46E−13 | 2.78E−17 | −5.11E−21 |

TABLE 15

| | K | C1 | C2 | C3 | C4 | C5 | C6 | C7 | C8 |
|---|---|---|---|---|---|---|---|---|---|
| S32 | −0.09573 | 0.001712 | −4.11E−05 | 3.32E−06 | −3.12E−07 | 4.28E−09 | −3.42E−11 | 1.43E−13 | −2.51E−16 |

Table 16 shows values of a ratio of the focal distance f1 of the first lens group I of the lens system to the focal distance f of an entire lens system, a ratio of the focal distance f2 of the second lens group II of the lens system to the focal distance f of the entire lens system, and a ratio of the combined focal distance f3 of third lens group III and the fourth lens group IV of the lens system to the focal distance f of the entire lens system in the numerical example. These values satisfy the above-mentioned conditional equations (1) to (3).

TABLE 16

| f1/f | 2.8 |
|---|---|
| f2/f | 8.7 |
| f3/f | −9.2 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 55% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm.

NUMERICAL EXAMPLE 5

Tables 17, 18, and 19 show data on numerical example 5.

TABLE 17

| Surface number | | Curvature radius (mm) | Space (mm) | Refractive index Nd | Abbe number vd |
|---|---|---|---|---|---|
| S0 | Panel | INF | 0 | | |
| S1 | | INF | 0.60 | 1.528 | 70.4 |
| S2 | | INF | 0.75 | | |
| S3 | | INF | 1.20 | 1.518 | 64.2 |
| S4 | | INF | 26.50 | | |
| S5 | | INF | 0.20 | 1.518 | 64.2 |
| S6 | | INF | 0.00 | | |
| S7 | | INF | 1.50 | 1.518 | 64.2 |
| S8 | | INF | 0.00 | | |
| S9 | | INF | 63.35 | 1.51822 | 64.2 |
| S10 | | INF | 4.85 | | |
| S11 | L1 | 77.129 | 9.03 | 1.8518 | 24.9 |
| S12 | | −168.891 | 5.63 | | |
| S13 | L2 | 55.799 | 1.40 | 1.8441 | 33.3 |
| S14 | L3 | 28.137 | 15.00 | 1.4968 | 79.5 |
| S15 | | −58.640 | 0.50 | | |
| S16 | L4 | −54.864 | 6.46 | 1.8274 | 41.2 |
| S17 | L5 | −27.694 | 15.00 | 1.8542 | 23.2 |
| S18 | | 351.547 | 35.52 | | |
| S19 | STOP | INF | 36.65 | | |
| S20 | L6 | −171.218 | 5.56 | 1.7859 | 26.5 |
| S21 | | −45.563 | 4.53 | | |
| S22 | L7 | −41.701 | 14.46 | 1.84 | 36.3 |
| S23 | | −78.920 | 105.48 | | |
| S24 | L8 | 119.197 | 8.27 | 1.7245 | 58.2 |
| S25 | | −1191.834 | 46.69 | | |
| S26 | L9 | 57.478 | 13.77 | 1.729 | 64.6 |
| S27 | | 36.820 | 18.79 | | |
| S28 | L10 | −37.217 | 5.00 | 1.8519 | 24.9 |
| S29 | | 678.044 | 32.26 | | |
| S30 | L11 | −7000.000 | 20.00 | 1.4915 | 57.8 |
| S31 | | −210.635 | 180.00 | | |
| S32 | Mirror 1 | 193.099 | −257.43 | | |
| S33 | Mirror 2 | INF | 300 | | |
| S34 | Image surface | INF | | | |

Table 18 shows aspherical coefficients of surface 30 and surface 31. Table 19 shows aspherical coefficients of surface 32.

TABLE 18

| | K | A | B | C | D | E |
|---|---|---|---|---|---|---|
| S30 | 0 | −2.64E−06 | 5.29E−10 | 2.15E−15 | −4.78E−18 | −2.15E−22 |
| S31 | −1.03E−04 | −2.67E−06 | 4.54E−10 | −1.91E−13 | 4.23E−17 | −7.60E−21 |

TABLE 19

| | K | C1 | C2 | C3 | C4 | C5 | C6 | C7 | C8 |
|---|---|---|---|---|---|---|---|---|---|
| S32 | −1.01E−01 | 2.32E−04 | −8.00E−05 | 3.42E−06 | −3.10E−07 | 4.28E−09 | −3.42E−11 | 1.43E−13 | −2.50E−16 |

Table 20 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (1) to (3) and the following conditional equations (4) to (6). The conditions enable further thinner projection and are advantageous for improving resolution capability. In other words, when these conditions are satisfied, the first lens group I is capable of correcting spherical aberration and curvature of field.

Further, the second lens group II is capable of achieving a function of controlling divergence of angles of view so as not to increase the size of the third lens group III. In accordance with this, it is possible to have a wide angle and reduce thickness for the third lens group III and the fourth lens group IV. And, it is possible to secure desired angles of view for the third lens group III and the fourth lens group IV without having an enlarged mirror for the catoptric system. In accordance with a synergistic effect resulting therefrom, it is possible to project light fluxes through further thinner lenses and improve the resolution capability. Moreover, the mirror in the catoptric system contributes to the wide angle and distortion correction.

$$79 < f1 < 81 \quad (4)$$

$$f2 < 253 \quad (5)$$

$$-275 < f3 \quad (6)$$

TABLE 20

| f1 | 79.183 |
|---|---|
| f2 | 229.518 |
| f3 | −201.684 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 59% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm.

NUMERICAL EXAMPLE 6

Tables 21, 22, and 23 show data on numerical example 6.

TABLE 21

| Surface number | | Curvature radius (mm) | Space (mm) | Refractive index Nd | Abbe number νd |
|---|---|---|---|---|---|
| S0 | Panel | INF | 0.00 | | |
| S1 | | INF | 0.60 | 1.528 | 70.4 |
| S2 | | INF | 0.75 | | |
| S3 | | INF | 1.20 | 1.518 | 64.2 |
| S4 | | INF | 26.50 | | |
| S5 | | INF | 0.20 | 1.518 | 64.2 |
| S6 | | INF | 0.00 | | |
| S7 | | INF | 1.50 | 1.518 | 64.2 |
| S8 | | INF | 0.00 | | |
| S9 | | INF | 63.35 | 1.51822 | 64.2 |
| S10 | | INF | 4.85 | | |
| S11 | L1 | 76.983 | 9.04 | 1.85195 | 23.5 |
| S12 | | −166.425 | 4.85 | | |
| S13 | L2 | 55.557 | 1.50 | 1.8459 | 30.8 |
| S14 | L3 | 28.030 | 15.00 | 1.4966 | 79.2 |
| S15 | | −59.598 | 0.50 | | |
| S16 | L4 | −55.676 | 6.47 | 1.8255 | 44.2 |
| S17 | L5 | −27.876 | 6.54 | 1.8542 | 23.2 |
| S18 | | 310.983 | 40.52 | | |
| S19 | STOP | INF | 37.15 | | |
| S20 | L6 | −185.200 | 5.72 | 1.7861 | 25.2 |
| S21 | | −46.775 | 4.74 | | |
| S22 | L7 | −42.720 | 14.88 | 1.8406 | 33.5 |
| S23 | | −80.518 | 109.47 | | |
| S24 | L8 | 113.266 | 8.39 | 1.7278 | 64.7 |
| S25 | | −3073.326 | 45.83 | | |
| S26 | L9 | 57.657 | 13.25 | 1.729 | 69 |
| S27 | | 36.949 | 18.57 | | |
| S28 | L10 | −37.950 | 5.00 | 1.8516 | 25.1 |
| S29 | | 481.338 | 32.59 | | |
| S30 | L11 | 1134.781 | 20.00 | 1.4915 | 57.8 |
| S31 | | −264.390 | 180.00 | | |
| S32 | Mirror 1 | 193.150 | −257.37 | | |
| S33 | Mirror 2 | INF | 300.00 | | |
| S34 | Image surface | INF | | | |

Table 22 shows aspherical coefficients of surface 30 and surface 31. Table 23 shows aspherical coefficients of surface 32.

TABLE 22

|  | K | A | B | C | D | E |
|---|---|---|---|---|---|---|
| S30 | −10 | −2.77E−06 | 5.39E−10 | 1.04E−15 | −4.94E−18 | −1.17E−22 |
| S31 | −5.15E−14 | −2.78E−06 | 5.04E−10 | −2.03E−13 | 4.42E−17 | −7.39E−21 |

TABLE 23

|  | K | C1 | C2 | C3 | C4 | C5 | C6 | C7 | C8 |
|---|---|---|---|---|---|---|---|---|---|
| S32 | −1.03E−01 | 7.61E−04 | −9.18E−05 | 3.50E−06 | −3.10E−07 | 4.28E−09 | −3.43E−11 | 1.43E−13 | −2.49E−16 |

Table 24 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (4) to (6).

TABLE 24

| f1 | 80.7 |
|---|---|
| f2 | 222.7 |
| f3 | −186.5 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 63% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm.

NUMERICAL EXAMPLE 7

Tables 25, 26, and 27 show data on numerical example 7.

TABLE 25

| Surface number | | Curvature radius (mm) | Space (mm) | Refractive index Nd | Abbe number vd |
|---|---|---|---|---|---|
| S0 | Panel | INF | 0.00 | | |
| S1 | | INF | 0.60 | 1.528 | 70.4 |
| S2 | | INF | 0.75 | | |
| S3 | | INF | 1.20 | 1.528 | 64.2 |
| S4 | | INF | 26.50 | | |
| S5 | | INF | 0.20 | 1.518 | 64.2 |
| S6 | | INF | 0.00 | | |
| S7 | | INF | 1.50 | 1.518 | 64.2 |
| S8 | | INF | 0.00 | | |
| S9 | | INF | 63.35 | 1.51822 | 64.2 |
| S10 | | INF | 4.85 | | |
| S11 | L1 | 76.506 | 8.99 | 1.8512 | 24.5 |
| S12 | | −172.906 | 5.74 | | |
| S13 | L2 | 58.308 | 1.50 | 1.8467 | 29.9 |
| S14 | L3 | 28.536 | 15.00 | 1.4979 | 78.9 |
| S15 | | −55.665 | 0.50 | | |
| S16 | L4 | −52.553 | 6.65 | 1.8294 | 39.4 |
| S17 | L5 | −26.970 | 15.00 | 1.8542 | 23.2 |
| S18 | | 570.462 | 35.16 | | |
| S19 | STOP | INF | 33.08 | | |
| S20 | L6 | −153.087 | 5.28 | 1.785 | 25.5 |
| S21 | | −44.878 | 4.00 | | |
| S22 | L7 | −41.752 | 13.63 | 1.8394 | 41.9 |
| S23 | | −79.452 | 93.86 | | |
| S24 | L8 | 109.988 | 8.05 | 1.7284 | 64.7 |
| S25 | | −2387.836 | 47.92 | | |
| S26 | L9 | 51.010 | 14.31 | 1.6311 | 69.5 |
| S27 | | 34.331 | 17.39 | | |
| S28 | L10 | −37.268 | 5.00 | 1.8525 | 24.4 |
| S29 | | 285.969 | 37.98 | | |
| S30 | L11 | −6996.848 | 19.72 | 1.4915 | 57.8 |
| S31 | | −208.873 | 182.24 | | |
| S32 | Mirror 1 | 193.101 | −257.82 | | |
| S33 | Mirror 2 | INF | 300.00 | | |
| S34 | Image surface | INF | | | |

Table 26 shows aspherical coefficients of surface 30 and surface 31. Table 27 shows aspherical coefficients of surface 32.

TABLE 26

|  | K | A | B | C | D | E |
|---|---|---|---|---|---|---|
| S30 | −10 | −2.65E−06 | 5.16E−10 | 2.37E−15 | −4.51E−18 | −1.73E−22 |
| S31 | −1.62E+00 | −2.57E−06 | 3.88E−10 | −1.41E−13 | 2.61E−17 | −4.48E−21 |

TABLE 27

| | K | C1 | C2 | C3 | C4 | C5 | C6 | C7 | C8 |
|---|---|---|---|---|---|---|---|---|---|
| S32 | −9.87E−02 | 1.11E−03 | −4.65E−06 | 3.33E−06 | −3.13E−07 | 4.27E−09 | −3.42E−11 | 1.43E−13 | −2.51E−16 |

Table 28 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (4) to (6).

TABLE 28

| f1 | 80.0 |
|---|---|
| f2 | 252.7 |
| f3 | −274.4 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 53% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm.

NUMERICAL EXAMPLE 8

Tables 29, 30, and 31 show data on numerical example 8.

TABLE 29

| Surface number | | Curvature radius (mm) | Space (mm) | Refractive index Nd | Abbe number vd |
|---|---|---|---|---|---|
| S0 | Panel | INF | 0 | | |
| S1 | | INF | 0.60 | 1.528 | 70.4 |
| S2 | | INF | 0.75 | | |
| S3 | | INF | 1.20 | 1.518 | 64.2 |
| S4 | | INF | 26.50 | | |
| S5 | | INF | 0.20 | 1.518 | 64.2 |
| S6 | | INF | 0.00 | | |
| S7 | | INF | 1.50 | 1.518 | 64.2 |
| S8 | | INF | 0.00 | | |
| S9 | | INF | 63.35 | 1.518 | 64.2 |
| S10 | | INF | 4.85 | | |
| S11 | L1 | 76.472 | 9.05 | 1.8506 | 24.7 |
| S12 | | −173.141 | 5.89 | | |
| S13 | L2 | 56.995 | 1.50 | 1.8452 | 31.7 |
| S14 | L3 | 28.279 | 15.00 | 1.4972 | 79.8 |
| S15 | | −57.009 | 0.50 | | |
| S16 | L4 | −53.581 | 6.62 | 1.829 | 40 |
| S17 | L5 | −27.185 | 15.00 | 1.8541 | 23.2 |
| S18 | | 449.985 | 34.97 | | |
| S19 | STOP | INF | 35.84 | | |
| S20 | L6 | −157.013 | 5.54 | 1.7852 | 25.8 |
| S21 | | −44.935 | 4.20 | | |
| S22 | L7 | −41.479 | 13.93 | 1.8397 | 38.3 |
| S23 | | −78.449 | 104.83 | | |
| S24 | L8 | 112.934 | 8.59 | 1.725 | 64.5 |
| S25 | | −1900.651 | 47.39 | | |
| S26 | L9 | 54.892 | 14.10 | 1.6794 | 66.8 |
| S27 | | 35.630 | 18.70 | | |
| S28 | L10 | −37.071 | 5.00 | 1.8518 | 25 |
| S29 | | 465.556 | 33.35 | | |
| S30 | L11 | −7004.174 | 20.00 | 1.4915 | 57.8 |
| S31 | | −207.632 | 180.00 | | |
| S32 | Mirror 1 | 192.916 | −257.22 | | |
| S33 | Mirror 2 | INF | 300 | | |
| S34 | Image surface | INF | | | |

Table 30 shows aspherical coefficients of surface 30 and surface 31. Table 31 shows aspherical coefficients of surface 32.

TABLE 30

| | K | A | B | C | D | E |
|---|---|---|---|---|---|---|
| S30 | −1.72E−11 | −2.62E−06 | 5.23E−10 | 2.67E−15 | −4.62E−18 | −2.40E−22 |
| S31 | −1.04E−01 | −2.59E−06 | 4.02E−10 | −1.58E−13 | 3.16E−17 | −5.90E−21 |

TABLE 31

| | K | C1 | C2 | C3 | C4 | C5 | C6 | C7 | C8 |
|---|---|---|---|---|---|---|---|---|---|
| S32 | −9.65E−02 | 8.21E−04 | −4.80E−05 | 3.27E−06 | −3.11E−07 | 4.28E−09 | −3.42E−11 | 1.43E−13 | −2.51E−16 |

Table 32 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the following conditional equations (7) to (9). The conditions enable thin projection and are advantageous for reducing the size of the mirror. In other words, when these conditions are satisfied, the first lens group I is capable of correcting spherical aberration and curvature of field.

Further, the second lens group II is capable of achieving a function of controlling divergence of angles of view so as not to increase the size of the third lens group III. In accordance with this, it is possible to have a wide angle and reduce thickness for the third lens group III and the fourth lens group IV. And, it is possible to secure desired angles of view for the third lens group III and the fourth lens group IV without having an enlarged mirror for the catoptric system. In accordance with a synergistic effect resulting therefrom, it is possible to perform thin projection and contribute to the reduced size of the mirror. Moreover, the mirror in the catoptric system contributes to the wide angle and distortion correction.

$$f1/f<3.0 \quad (7)$$

$$7.7<f2/f \quad (8)$$

$$f3/f<-5.6 \quad (9)$$

TABLE 32

| | |
|---|---|
| f1/f | 2.8 |
| f2/f | 7.8 |
| f3/f | −5.64 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 50% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm. It is possible to have a height of the aspherical mirror relative to a screen height not more than 122 mm and an effective area of the mirror not more than 19,145 square millimeters.

NUMERICAL EXAMPLE 9

Tables 33, 34, and 35 show data on numerical example 9.

TABLE 33

| Surface number | | Curvature radius (mm) | Space (mm) | Refractive index Nd | Abbe number vd |
|---|---|---|---|---|---|
| S0 | Panel | INF | 0 | | |
| S1 | | INF | 0.60 | 1.528 | 70.4 |
| S2 | | INF | 0.75 | | |
| S3 | | INF | 1.20 | 1.518 | 64.2 |
| S4 | | INF | 26.50 | | |
| S5 | | INF | 0.20 | 1.518 | 64.2 |
| S6 | | INF | 0.00 | | |
| S7 | | INF | 1.50 | 1.518 | 64.2 |
| S8 | | INF | 0.00 | | |
| S9 | | INF | 63.35 | 1.518 | 64.2 |
| S10 | | INF | 4.85 | | |
| S11 | L1 | 77.129 | 9.03 | 1.8518 | 24.9 |
| S12 | | −168.892 | 5.63 | | |
| S13 | L2 | 55.799 | 1.40 | 1.8441 | 33.3 |
| S14 | L3 | 28.137 | 15.00 | 1.4968 | 79.5 |
| S15 | | −58.640 | 0.50 | | |
| S16 | L4 | −54.864 | 6.46 | 1.8274 | 41.2 |
| S17 | L5 | −27.694 | 15.00 | 1.8542 | 23.2 |
| S18 | | 351.538 | 35.52 | | |
| S19 | STOP | INF | 36.65 | | |
| S20 | L6 | −171.218 | 5.56 | 1.7859 | 26.5 |
| S21 | | −45.563 | 4.53 | | |
| S22 | L7 | −41.701 | 14.46 | 1.8399 | 36.3 |
| S23 | | −78.920 | 105.48 | | |
| S24 | L8 | 119.197 | 8.27 | 1.7245 | 58.2 |
| S25 | | −1191.838 | 46.69 | | |
| S26 | L9 | 57.478 | 13.77 | 1.729 | 64.7 |
| S27 | | 36.820 | 18.79 | | |
| S28 | L10 | −37.217 | 5.00 | 1.8519 | 24.9 |
| S29 | | 677.999 | 32.26 | | |
| S30 | L11 | −7000.024 | 20.00 | 1.4915 | 57.8 |
| S31 | | −210.633 | 180.00 | | |
| S32 | Mirror 1 | 193.099 | −257.43 | | |
| S33 | Mirror 2 | INF | 300 | | |
| S34 | Image surface | INF | | | |

Table 34 shows aspherical coefficients of surface 30 and surface 31. Table 35 shows aspherical coefficients of surface 32.

TABLE 34

| | K | A | B | C | D | E |
|---|---|---|---|---|---|---|
| S30 | 3.64E−11 | −2.64E−06 | 5.29E−10 | 2.15E−15 | −4.78E−18 | −2.15E−22 |
| S31 | −1.16E−14 | −2.67E−06 | 4.54E−10 | −1.91E−13 | 4.23E−17 | −7.60E−21 |

TABLE 35

| | K | C1 | C2 | C3 | C4 | C5 | C6 | C7 | C8 |
|---|---|---|---|---|---|---|---|---|---|
| S32 | −1.01E−01 | 2.32E−04 | −8.00E−05 | 3.42E−06 | −3.10E−07 | 4.28E−09 | −3.42E−11 | 1.43E−13 | −2.50E−16 |

Table 36 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (7) to (9) and the following conditional equations (10) to (12). The conditions enable further thinner projection and are advantageous for further reducing the size of the mirror. In other words, when these conditions are satisfied, the first lens group I is capable of correcting spherical aberration and curvature of field.

Further, the second lens group II is capable of achieving a function of controlling divergence of angles of view so as not to increase the size of the third lens group III. In accordance with this, it is possible to have a wide angle and reduce thickness for the third lens group III and the fourth lens group IV. And, it is possible to secure desired angles of view for the third lens group III and the fourth lens group IV without having an enlarged mirror for the catoptric system. In accordance with a synergistic effect resulting therefrom, it is possible to project light fluxes through further thinner lenses and contribute to the reduced size of the mirror. Moreover, the mirror in the catoptric system contributes to the wide angle and distortion correction.

$$79 < f1 < 81 \quad (10)$$

$$210 < f2 \quad (11)$$

$$f3 < -152 \quad (12)$$

TABLE 36

| | |
|---|---|
| f1 | 79.2 |
| f2 | 229.5 |
| f3 | −201.7 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 50% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm. It is possible to have a height of the aspherical mirror relative to a screen height not more than 121 mm and an effective area of the mirror not more than 19,031 square millimeters.

NUMERICAL EXAMPLE 10

Tables 37, 38, and 39 show data on numerical example 10.

TABLE 37

| Surface number | | Curvature radius (mm) | Space (mm) | Refractive index Nd | Abbe number vd |
|---|---|---|---|---|---|
| S0 | Panel | INF | 0 | | |
| S1 | | INF | 0.6 | 1.528 | 70.4 |
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.51822 | 64.2 |
| S10 | | INF | 4.85 | | |
| S11 | L1 | 76.983 | 9.04 | 1.85195 | 23.5 |
| S12 | | −166.425 | 4.85 | | |
| S13 | L2 | 55.557 | 1.50 | 1.8459 | 30.8 |
| S14 | L3 | 28.030 | 15.00 | 1.4966 | 79.2 |
| S15 | | −59.598 | 0.50 | | |
| S16 | L4 | −55.676 | 6.47 | 1.8255 | 44.2 |
| S17 | L5 | −27.876 | 6.54 | 1.8542 | 23.2 |
| S18 | | 310.983 | 40.52 | | |
| S19 | STOP | INF | 37.15 | | |
| S20 | L6 | −185.200 | 5.72 | 1.7861 | 25.2 |
| S21 | | −46.775 | 4.74 | | |
| S22 | L7 | −42.720 | 14.88 | 1.8406 | 33.5 |
| S23 | | −80.518 | 109.47 | | |
| S24 | L8 | 113.266 | 8.39 | 1.7278 | 64.7 |
| S25 | | −3073.326 | 45.83 | | |
| S26 | L9 | 57.657 | 13.25 | 1.729 | 69 |
| S27 | | 36.949 | 18.57 | | |
| S28 | L10 | −37.950 | 5.00 | 1.8516 | 25.1 |
| S29 | | 481.338 | 32.59 | | |
| S30 | L11 | 1134.781 | 20.00 | 1.4915 | 57.8 |
| S31 | | −264.390 | 180.00 | | |
| S32 | Mirror 1 | 193.150 | −257.37 | | |
| S33 | Mirror 2 | INF | 300 | | |
| S34 | Image surface | INF | | | |

Table 38 shows aspherical coefficients of surface 30 and surface 31. Table 39 shows aspherical coefficients of surface 32.

TABLE 38

| | K | A | B | C | D | E |
|---|---|---|---|---|---|---|
| S30 | −10 | −2.77E−06 | 5.39E−10 | 1.04E−15 | −4.94E−18 | −1.17E−22 |
| S31 | −5.15E−14 | −2.78E−06 | 5.04E−10 | −2.03E−13 | 4.42E−17 | −7.39E−21 |

TABLE 39

| | K | C1 | C2 | C3 | C4 | C5 | C6 | C7 | C8 |
|---|---|---|---|---|---|---|---|---|---|
| S32 | −1.03E−01 | 7.61E−04 | −9.18E−05 | 3.50E−06 | −3.10E−07 | 4.28E−09 | −3.43E−11 | 1.43E−13 | −2.49E−16 |

Table 40 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (10) to (12).

TABLE 40

| | |
|---|---|
| f1 | 80.7 |
| f2 | 222.7 |
| f3 | −186.5 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 50% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm. It is possible to have a height of the aspherical mirror relative to a screen height not more than 121 mm and an effective area of the mirror not more than 19,066 square millimeters.

NUMERICAL EXAMPLE 11

Tables 41, 42, and 43 show data on numerical example 11.

TABLE 41

| Surface number | | Curvature radius (mm) | Space (mm) | Refractive index Nd | Abbe number vd |
|---|---|---|---|---|---|
| S0 | Panel | INF | 0 | | |
| S1 | | INF | 0.6 | 1.528 | 70.4 |
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.51822 | 64.2 |
| S10 | | INF | 4.85 | | |
| S11 | L1 | 77.359 | 9.08 | 1.8522 | 24.6 |
| S12 | | −165.147 | 5.00 | | |
| S13 | L2 | 55.308 | 1.50 | 1.8436 | 34.1 |
| S14 | L3 | 28.024 | 15.00 | 1.4964 | 79 |
| S15 | | −59.968 | 0.50 | | |
| S16 | L4 | −55.869 | 6.42 | 1.8255 | 42.7 |
| S17 | L5 | −28.040 | 5.83 | 1.8542 | 23.2 |
| S18 | | 305.510 | 41.02 | | |
| S19 | STOP | INF | 39.11 | | |
| S20 | L6 | −218.141 | 5.89 | 1.7861 | 25.8 |
| S21 | | −48.257 | 5.17 | | |
| S22 | L7 | −43.612 | 15.00 | 1.8403 | 30.4 |
| S23 | | −82.388 | 118.25 | | |
| S24 | L8 | 115.867 | 8.67 | 1.7254 | 52.7 |
| S25 | | −1457.379 | 38.13 | | |
| S26 | L9 | 60.540 | 13.26 | 1.729 | 64.7 |
| S27 | | 37.414 | 20.11 | | |
| S28 | L10 | −37.321 | 2.00 | 1.8523 | 24.6 |
| S29 | | 1652.453 | 31.10 | | |
| S30 | L11 | −8001.030 | 20.00 | 1.4915 | 57.8 |
| S31 | | −237.611 | 180.00 | | |
| S32 | Mirror 1 | 193.418 | −257.64 | | |
| S33 | Mirror 2 | INF | 300 | | |
| S34 | Image surface | INF | | | |

Table 42 shows aspherical coefficients of surface 30 and surface 31. Table 43 shows aspherical coefficients of surface 32.

TABLE 42

| | K | A | B | C | D | E |
|---|---|---|---|---|---|---|
| S30 | −4.71E−10 | −3.26E−06 | 8.41E−10 | −5.28E−14 | −2.16E−18 | −8.07E−23 |
| S31 | −9.67E−13 | −3.32E−06 | 8.04E−10 | −3.54E−13 | 8.61E−17 | −1.35E−20 |

TABLE 43

| | K | C1 | C2 | C3 | C4 | C5 | C6 | C7 | C8 |
|---|---|---|---|---|---|---|---|---|---|
| S32 | −0.1043 | 0.003944 | −0.00042 | 9.59E−06 | −3.59E−07 | 4.44E−09 | −3.42E−11 | 1.41E−13 | −2.45E−16 |

Table 44 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (10) to (12).

TABLE 44

| | |
|---|---|
| f1 | 80.3 |
| f2 | 210.5 |
| f3 | −152.2 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 50% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm. It is possible to have a height of the aspherical mirror relative to a screen height not more than 122 mm and an effective area of the mirror not more than 19,145 square millimeters.

NUMERICAL EXAMPLE 12

Tables 45, 46, and 47 show data on numerical example 12.

TABLE 45

| Surface number | | Curvature radius (mm) | Space (mm) | Refractive index Nd | Abbe number νd |
|---|---|---|---|---|---|
| S0 | Panel | INF | 0 | | |
| S1 | | INF | 0.6 | 1.528 | 70.4 |
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.518 | 64.2 |
| S10 | | INF | 4.85 | | |
| S11 | L1 | 77.359 | 9.08 | 1.8522 | 24.6 |
| S12 | | −165.147 | 5.00 | | |
| S13 | L2 | 55.308 | 1.50 | 1.8436 | 34.1 |
| S14 | L3 | 28.024 | 15.00 | 1.4964 | 79 |
| S15 | | −59.968 | 0.50 | | |
| S16 | L4 | −55.869 | 6.42 | 1.8255 | 42.7 |
| S17 | L5 | −28.040 | 5.83 | 1.8542 | 23.2 |
| S18 | | 305.510 | 41.02 | | |
| S19 | STOP | INF | 37.50 | | |
| S20 | L6 | −196.579 | 7.37 | 1.7861 | 25.8 |
| S21 | | −47.436 | 4.87 | | |
| S22 | L7 | −43.169 | 15.00 | 1.8403 | 30.4 |
| S23 | | −81.886 | 111.71 | | |
| S24 | L8 | 120.483 | 8.30 | 1.7254 | 52.7 |
| S25 | | −1455.759 | 45.38 | | |
| S26 | L9 | 59.462 | 13.22 | 1.729 | 64.7 |
| S27 | | 37.665 | 19.38 | | |
| S28 | L10 | −37.410 | 2.00 | 1.8523 | 24.6 |
| S29 | | 1028.587 | 31.97 | | |
| S30 | L11 | −8002.430 | 20.00 | 1.4915 | 57.8 |
| S31 | | −222.085 | 180.00 | | |
| S32 | Mirror 1 | 193.144 | −257.59 | | |
| S33 | Mirror 2 | INF | 300 | | |
| S34 | Image surface | INF | | | |

Table 46 shows aspherical coefficients of surface 30 and surface 31. Table 47 shows aspherical coefficients of surface 32.

TABLE 46

| | K | A | B | C | D | E |
|---|---|---|---|---|---|---|
| S30 | −5.90E−10 | −2.87E−06 | 5.85E−10 | 3.96E−15 | −5.23E−18 | −3.77E−22 |
| S31 | −7.40E−14 | −2.91E−06 | 5.48E−10 | −2.41E−13 | 5.62E−17 | −9.98E−21 |

TABLE 47

| | K | C1 | C2 | C3 | C4 | C5 | C6 | C7 | C8 |
|---|---|---|---|---|---|---|---|---|---|
| S32 | −1.02E−01 | 1.15E−03 | −1.45E−04 | 4.04E−06 | −3.13E−07 | 4.29E−09 | −3.43E−11 | 1.42E−13 | −2.49E−16 |

Table 48 shows values of a ratio of the focal distance f1 of the first lens group I of the lens system to the focal distance f of the entire lens system, a ratio of the focal distance f2 of the second lens group II of the lens system to the focal distance f of the entire lens system, and a ratio of the combined focal distance f3 of third lens group III and the fourth lens group IV of the lens system to the focal distance f of the entire lens system in the numerical example. These values satisfy the following conditional equations (13) to (15). The conditions enable thin projection and are advantageous for obtaining higher MTF and reducing the size of the mirror at the same time. In other words, when these conditions are satisfied, the first lens group I is capable of correcting spherical aberration and curvature of field.

Further, the second lens group II is capable of achieving a function of controlling divergence of angles of view so as not to increase the size of the third lens group III. In accordance with this, it is possible to have a wide angle and reduce thickness for the third lens group III and the fourth lens group IV. And, it is possible to secure desired angles of view for the third lens group III and the fourth lens group IV without having an enlarged mirror for the catoptric system. In accordance with a synergistic effect resulting therefrom, it is possible to perform thin projection and contribute to higher MTF and the reduced size of the mirror. Moreover, the mirror in the catoptric system contributes to the wide angle and distortion correction.

$$2.8 < f1/f < 3.0 \quad (13)$$

$$7.9 < f2/f < 8.2 \quad (14)$$

$$-7.2 < f3/f < -6.0 \quad (15)$$

TABLE 48

| | |
|---|---|
| f1/f | 2.9 |
| f2/f | 8.0 |
| f3/f | −6.3 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 66.1% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm. It is possible to have a height of the aspherical mirror relative to a screen height not more than 121 mm and an effective area of the mirror not more than 19,059 square millimeters.

NUMERICAL EXAMPLE 13

Tables 49, 50, and 51 show data on numerical example 13.

TABLE 49

| Surface number | | Curvature radius (mm) | Space (mm) | Refractive index Nd | Abbe number νd |
|---|---|---|---|---|---|
| S0 | Panel | INF | 0 | | |
| S1 | | INF | 0.6 | 1.528 | 70.4 |
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.518 | 64.2 |
| S10 | | INF | 4.85 | | |
| S11 | L1 | 77.129 | 9.03 | 1.8518 | 24.9 |
| S12 | | −168.891 | 5.63 | | |
| S13 | L2 | 55.799 | 1.40 | 1.8841 | 33.3 |
| S14 | L3 | 28.137 | 15.00 | 1.4968 | 79.5 |
| S15 | | −58.640 | 0.50 | | |
| S16 | L4 | −54.864 | 6.46 | 1.8274 | 41.2 |
| S17 | L5 | −27.694 | 15.00 | 1.8542 | 23.2 |
| S18 | | 351.547 | 35.52 | | |
| S19 | STOP | INF | 36.65 | | |
| S20 | L6 | −171.218 | 5.56 | 1.7859 | 26.5 |
| S21 | | −45.563 | 4.53 | | |
| S22 | L7 | −41.701 | 14.46 | 1.8399 | 36.3 |
| S23 | | −78.920 | 105.48 | | |
| S24 | L8 | 119.197 | 8.27 | 1.7245 | 5802 |
| S25 | | −1191.834 | 46.69 | | |
| S26 | L9 | 57.478 | 13.77 | 1.729 | 64.6 |
| S27 | | 36.820 | 18.79 | | |
| S28 | L10 | −37.217 | 5.00 | 1.8519 | 24.9 |
| S29 | | 678.044 | 32.26 | | |
| S30 | L11 | −7000.000 | 20.00 | 1.4915 | 57.8 |
| S31 | | −210.635 | 180.00 | | |
| S32 | Mirror 1 | 193.099 | −257.43 | | |
| S33 | Mirror 2 | INF | 300 | | |
| S34 | Image surface | INF | | | |

Table 50 shows aspherical coefficients of surface 30 and surface 31. Table 51 shows aspherical coefficients of surface 32.

TABLE 50

| | K | A | B | C | D | E |
|---|---|---|---|---|---|---|
| S30 | 0.00E+00 | −2.64E−06 | 5.29E−10 | 2.15E−15 | −4.78E−18 | −2.15E−22 |
| S31 | −1.03E−04 | −2.67E−06 | 4.54E−10 | −1.91E−13 | 4.23E−17 | −7.60E−21 |

TABLE 51

| | K | C1 | C2 | C3 | C4 | C5 | C6 | C7 | C8 |
|---|---|---|---|---|---|---|---|---|---|
| S32 | −1.01E−01 | 2.32E−04 | −8.00E−05 | 3.42E−06 | −3.10E−07 | 4.28E−09 | −3.42E−11 | 1.43E−13 | −2.50E−16 |

Table 52 shows values of a ratio of the focal distance f1 of the first lens group I of the lens system to the focal distance f of the entire lens system, a ratio of the focal distance f2 of the second lens group II of the lens system to the focal distance f of the entire lens system, and a ratio of the combined focal distance f3 of third lens group III and the fourth lens group IV of the lens system to the focal distance f of the entire lens system in the numerical example. These values satisfy the above-mentioned conditional equations (13) to (15).

TABLE 52

| f1/f | 2.84 |
|---|---|
| f2/f | 8.18 |
| f3/f | −7.19 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 59.7% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm. It is possible to have a height of the aspherical mirror relative to a screen height not more than 121 mm and an effective area of the mirror not more than 19,059 square millimeters.

NUMERICAL EXAMPLE 14

Tables 53, 54, and 55 show data on numerical example 14.

TABLE 53

| Surface number | | Curvature radius (mm) | Space (mm) | Refractive index Nd | Abbe number νd |
|---|---|---|---|---|---|
| S0 | Panel | INF | 0 | | |
| S1 | | INF | 0.6 | 1.528 | 70.4 |
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.518 | 64.2 |
| S10 | | INF | 4.85 | | |
| S11 | L1 | 77.359 | 9.08 | 1.8522 | 24.6 |
| S12 | | −165.147 | 5.00 | | |
| S13 | L2 | 55.308 | 1.50 | 1.8436 | 34.1 |
| S14 | L3 | 28.024 | 15.00 | 1.4937 | 79 |
| S15 | | −59.968 | 0.50 | | |
| S16 | L4 | −55.869 | 6.42 | 1.8255 | 42.7 |
| S17 | L5 | −28.040 | 5.83 | 1.8542 | 23.2 |
| S18 | | 305.510 | 41.02 | | |
| S19 | STOP | INF | 37.51 | | |
| S20 | L6 | −192.027 | 6.73 | 1.7861 | 25.8 |
| S21 | | −46.861 | 4.65 | | |
| S22 | L7 | −42.763 | 15.00 | 1.8403 | 30.4 |
| S23 | | −81.318 | 110.52 | | |
| S24 | L8 | 120.830 | 8.26 | 1.7254 | 52.7 |
| S25 | | −1340.406 | 45.74 | | |
| S26 | L9 | 58.786 | 13.05 | 1.729 | 64.7 |
| S27 | | 37.493 | 19.15 | | |
| S28 | L10 | −37.563 | 3.30 | 1.8523 | 24.6 |
| S29 | | 889.966 | 32.78 | | |
| S30 | L11 | −8000.001 | 20.00 | 1.4915 | 57.8 |
| S31 | | −226.616 | 180.00 | | |
| S32 | Mirror 1 | 193.153 | −257.49 | | |
| S33 | Mirror 2 | INF | 300 | | |
| S34 | Image surface | INF | | | |

Table 54 shows aspherical coefficients of surface 30 and surface 31. Table 55 shows aspherical coefficients of surface 32.

TABLE 54

| | K | A | B | C | D | E |
|---|---|---|---|---|---|---|
| S30 | 2.48E−10 | −2.76E−06 | 5.50E−10 | 3.05E−15 | −4.81E−18 | −2.76E−22 |
| S31 | 1.43E−14 | −2.81E−06 | 5.10E−10 | −2.13E−13 | 4.74E−17 | −8.18E−21 |

TABLE 55

| | K | C1 | C2 | C3 | C4 | C5 | C6 | C7 | C8 |
|---|---|---|---|---|---|---|---|---|---|
| S32 | −1.02E−01 | 1.11E−03 | −1.30E−04 | 3.81E−06 | −3.11E−07 | 4.28E−09 | −3.43E−11 | 1.43E−13 | −2.49E−16 |

Table 56 shows values of a ratio of the focal distance f1 of the first lens group I of the lens system to the focal distance f of the entire lens system, a ratio of the focal distance f2 of the second lens group II of the lens system to the focal distance f of the entire lens system, and a ratio of the combined focal distance f3 of third lens group III and the fourth lens group IV of the lens system to the focal distance f of the entire lens system in the numerical example. These values satisfy the above-mentioned conditional equations (13) to (15).

TABLE 56

| | |
|---|---|
| f1/f | 2.9 |
| f2/f | 8.0 |
| f3/f | −6.4 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 65.4% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm. It is possible to have a height of the aspherical mirror relative to a screen height not more than 121 mm and an effective area of the mirror not more than 19,043 square millimeters.

NUMERICAL EXAMPLE 15

Tables 57, 58, and 59 show data on numerical example 15.

TABLE 57

| Surface number | | Curvature radius (mm) | Space (mm) | Refractive index Nd | Abbe number νd |
|---|---|---|---|---|---|
| S0 | Panel | INF | 0 | | |
| S1 | | INF | 0.6 | 1.528 | 70.4 |

TABLE 57-continued

| Surface number | | Curvature radius (mm) | Space (mm) | Refractive index Nd | Abbe number νd |
|---|---|---|---|---|---|
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.518 | 64.2 |
| S10 | | INF | 4.85 | | |
| S11 | L1 | 77.359 | 9.08 | 1.8522 | 24.6 |
| S12 | | −165.147 | 5.00 | | |
| S13 | L2 | 55.308 | 1.50 | 1.8436 | 34.1 |
| S14 | L3 | 28.024 | 15.00 | 1.4964 | 79 |
| S15 | | −59.968 | 0.50 | | |
| S16 | L4 | −55.869 | 6.42 | 1.8255 | 42.7 |
| S17 | L5 | −28.040 | 5.83 | 1.8542 | 23.2 |
| S18 | | 305.510 | 41.02 | | |
| S19 | STOP | INF | 37.09 | | |
| S20 | L6 | −205.302 | 7.62 | 1.7861 | 25.8 |
| S21 | | −47.707 | 4.89 | | |
| S22 | L7 | −43.377 | 15.00 | 1.8403 | 30.4 |
| S23 | | −82.402 | 115.02 | | |
| S24 | L8 | 117.661 | 8.43 | 1.7254 | 52.7 |
| S25 | | −1646.979 | 41.62 | | |
| S26 | L9 | 61.033 | 14.15 | 1.729 | 64.7 |
| S27 | | 37.636 | 19.55 | | |
| S28 | L10 | −37.075 | 2.00 | 1.8523 | 24.6 |
| S29 | | 1472.583 | 31.31 | | |
| S30 | L11 | −7999.826 | 20.00 | 1.4915 | 57.8 |
| S31 | | −221.324 | 180.00 | | |
| S32 | Mirror 1 | 193.439 | −257.82 | | |
| S33 | Mirror 2 | INF | 300 | | |
| S34 | Image surface | INF | | | |

Table 58 shows aspherical coefficients of surface 30 and surface 31. Table 59 shows aspherical coefficients of surface 32.

TABLE 58

| | K | A | B | C | D | E |
|---|---|---|---|---|---|---|
| S30 | −2.98E−10 | −3.14E−06 | 7.75E−10 | −3.00E−14 | −7.33E−18 | 4.15E−22 |
| S31 | −1.43E−13 | −3.14E−06 | 6.95E−10 | −3.00E−13 | 7.11E−17 | −1.15E−20 |

TABLE 59

| | K | C1 | C2 | C3 | C4 | C5 | C6 | C7 | C8 |
|---|---|---|---|---|---|---|---|---|---|
| S32 | −9.81E−02 | 3.09E−03 | −3.33E−04 | 7.77E−06 | −3.44E−07 | 4.37E−09 | −3.41E−11 | 1.42E−13 | −2.48E−16 |

Table 60 shows values of a ratio of the focal distance f1 of the first lens group I of the lens system to the focal distance f of the entire lens system, a ratio of the focal distance f2 of the second lens group II of the lens system to the focal distance f of the entire lens system, and a ratio of the combined focal distance f3 of third lens group III and the fourth lens group IV of the lens system to the focal distance f of the entire lens system in the numerical example. These values satisfy the above-mentioned conditional equations (13) to (15).

TABLE 60

| | |
|---|---|
| f1/f | 2.95 |
| f2/f | 7.92 |
| f3/f | −6.01 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 66.3% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm. It is possible to have a height of the aspherical mirror relative to a screen height not more than 121 mm and an effective area of the mirror not more than 19,026 square millimeters.

NUMERICAL EXAMPLE 16

Tables 61, 62, and 63 show data on numerical example 16.

TABLE 61

| Surface number | | Curvature radius (mm) | Space (mm) | Refractive index Nd | Abbe number vd |
|---|---|---|---|---|---|
| S0 | Panel | INF | 0 | | |
| S1 | | INF | 0.6 | 1.528 | 70.4 |
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.518 | 64.2 |
| S10 | | INF | 4.85 | | |
| S11 | L1 | 77.359 | 9.08 | 1.8522 | 24.6 |
| S12 | | −165.147 | 5.00 | | |
| S13 | L2 | 55.308 | 1.50 | 1.8436 | 34.1 |
| S14 | L3 | 28.024 | 15.00 | 1.4964 | 79 |
| S15 | | −59.968 | 0.50 | | |
| S16 | L4 | −55.869 | 6.42 | 1.8255 | 42.7 |
| S17 | L5 | −28.040 | 5.83 | 1.8542 | 23.2 |
| S18 | | 305.510 | 41.02 | | |
| S19 | STOP | INF | 37.09 | | |
| S20 | L6 | −205.302 | 7.62 | 1.7861 | 25.8 |
| S21 | | −47.707 | 4.89 | | |
| S22 | L7 | −43.377 | 15.00 | 1.8403 | 30.4 |
| S23 | | −82.402 | 115.02 | | |
| S24 | L8 | 117.661 | 8.43 | 1.7254 | 52.7 |
| S25 | | −1646.979 | 41.62 | | |
| S26 | L9 | 61.033 | 14.15 | 1.729 | 64.7 |
| S27 | | 37.636 | 19.55 | | |
| S28 | L10 | −37.075 | 2.00 | 1.8523 | 24.6 |
| S29 | | 1472.583 | 31.31 | | |
| S30 | L11 | −7999.826 | 20.00 | 1.4915 | 57.8 |
| S31 | | −221.324 | 180.00 | | |
| S32 | Mirror 1 | 193.439 | −257.82 | | |
| S33 | Mirror 2 | INF | 300 | | |
| S34 | Image surface | INF | | | |

Table 62 shows aspherical coefficients of surface 30 and surface 31. Table 63 shows aspherical coefficients of surface 32.

TABLE 62

| | K | A | B | C | D | E |
|---|---|---|---|---|---|---|
| S11 | −2.98E−10 | −3.14E−06 | 7.75E−10 | −3.00E−14 | −7.33E−18 | 4.15E−22 |
| S12 | −1.43E−13 | −3.14E−06 | 6.95E−10 | −3.00E−13 | 7.11E−17 | −1.15E−20 |

TABLE 63

| | K | C1 | C2 | C3 | C4 | C5 | C6 | C7 | C8 |
|---|---|---|---|---|---|---|---|---|---|
| S32 | −9.81E−02 | 3.09E−03 | −3.33E−04 | 7.77E−06 | −3.44E−07 | 4.37E−09 | −3.41E−11 | 1.42E−13 | −2.48E−16 |

Table 64 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (13) to (15) and the following conditional equations (16) to (18). The conditions enable further thinner projection and are advantageous for obtaining higher MTF and reducing the size of the mirror at the same time. In other words, when these conditions are satisfied, the first lens group I is capable of correcting spherical aberration and curvature of field.

Further, the second lens group II is capable of achieving a function of controlling divergence of angles of view so as not to increase the size of the third lens group III. In accordance with this, it is possible to have a wide angle and reduce thickness for the third lens group III and the fourth lens group IV.

And, it is possible to secure desired angles of view for the third lens group III and the fourth lens group IV without having an enlarged mirror for the catoptric system. In accordance with a synergistic effect resulting therefrom, it is possible to perform thin projection and contribute to higher MTF and the reduced size of the mirror. Moreover, the mirror in the catoptric system contributes to the wide angle and distortion correction.

$$79 < f1 < 81 \quad (16)$$

$$210 < f2 < 230 \quad (17)$$

$$-202 < f3 < -153 \quad (18)$$

TABLE 64

| | |
|---|---|
| f1 | 80.3 |
| f2 | 215.8 |
| f3 | -163.7 |

In this numerical example, it is possible to have a height of the aspherical mirror relative to a screen height not more than 121 mm and an effective area of the mirror not more than 19,026 square millimeters. In a frequency corresponding to QXGA, a white MTF value not less than 66.3% is obtained.

NUMERICAL EXAMPLE 17

Tables 65, 66, and 67 show data on numerical example 17.

TABLE 65

| Surface number | | Curvature radius (mm) | Space (mm) | Refractive index Nd | Abbe number vd |
|---|---|---|---|---|---|
| S0 | Panel | INF | 0 | | |
| S1 | | INF | 0.6 | 1.528 | 70.4 |
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.518 | 64.2 |
| S10 | | INF | 4.85 | | |
| S11 | L1 | 77.189 | 9.02 | 1.852 | 24.9 |
| S12 | | -168.381 | 5.49 | | |
| S13 | L2 | 55.691 | 1.40 | 1.844 | 33.6 |
| S14 | L3 | 28.130 | 15.00 | 1.497 | 79.3 |
| S15 | | -58.870 | 0.50 | | |
| S16 | L4 | -55.052 | 6.42 | 1.827 | 41.4 |
| S17 | L5 | -27.812 | 14.87 | 1.854 | 23.2 |
| S18 | | 339.410 | 35.63 | | |
| S19 | STOP | INF | 36.63 | | |
| S20 | L6 | -175.476 | 5.57 | 1.786 | 26.5 |
| S21 | | -45.750 | 4.57 | | |
| S22 | L7 | -41.838 | 14.57 | 1.84 | 35.6 |
| S23 | | -79.331 | 105.91 | | |
| S24 | L8 | 119.452 | 8.24 | 1.725 | 57.5 |
| S25 | | -1192.919 | 46.54 | | |
| S26 | L9 | 57.870 | 13.67 | 1.729 | 64.7 |
| S27 | | 36.983 | 18.82 | | |
| S28 | L10 | -37.229 | 5.00 | 1.852 | 24.9 |
| S29 | | 707.530 | 32.13 | | |
| S30 | L11 | -7000.000 | 20.00 | 1.492 | 57.8 |
| S31 | | -211.592 | 180.00 | | |
| S32 | Mirror 1 | 193.109 | -257.48 | | |
| S33 | Mirror 2 | INF | 300 | | |
| S34 | Image surface | INF | | | |

Table 66 shows aspherical coefficients of surface 30 and surface 31. Table 67 shows aspherical coefficients of surface 32.

TABLE 66

| | K | A | B | C | D | E |
|---|---|---|---|---|---|---|
| S11 | 4.16E-10 | -2.65E-06 | 5.32E-10 | 2.06E-15 | -4.81E-18 | -2.11E-22 |
| S12 | 8.62E-15 | -2.69E-06 | 4.62E-10 | -1.96E-13 | 4.38E-17 | -7.83E-21 |

TABLE 67

| | K | C1 | C2 | C3 | C4 | C5 | C6 | C7 | C8 |
|---|---|---|---|---|---|---|---|---|---|
| S32 | -1.01E-01 | 8.14E-05 | -8.35E-05 | 3.43E-06 | -3.10E-07 | 4.28E-09 | -3.42E-11 | 1.43E-13 | -2.50E-16 |

Table 68 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (16) to (18).

TABLE 68

| f1 | 79.3 |
|---|---|
| f2 | 227.1 |
| f3 | −197.5 |

In this numerical example, it is possible to have a height of the aspherical mirror relative to a screen height not more than 121 mm and an effective area of the mirror not more than 19,028 square millimeters. In a frequency corresponding to QXGA, a white MTF value not less than 60.6% is obtained.

NUMERICAL EXAMPLE 18

Tables 69, 70, and 71 show data on numerical example 18.

TABLE 69

| Surface number | | Curvature radius (mm) | Space (mm) | Refractive index Nd | Abbe number vd |
|---|---|---|---|---|---|
| S0 | Panel | INF | 0 | | |
| S1 | | INF | 0.6 | 1.528 | 70.4 |
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.518 | 64.2 |
| S10 | | INF | 4.85 | | |

TABLE 69-continued

| Surface number | | Curvature radius (mm) | Space (mm) | Refractive index Nd | Abbe number vd |
|---|---|---|---|---|---|
| S11 | L1 | 77.359 | 9.08 | 1.852 | 24.9 |
| S12 | | −165.147 | 5.00 | | |
| S13 | L2 | 55.308 | 1.50 | 1.844 | 34.1 |
| S14 | L3 | 28.024 | 15.00 | 1.496 | 79 |
| S15 | | −59.968 | 0.50 | | |
| S16 | L4 | −55.869 | 6.42 | 1.825 | 42.7 |
| S17 | L5 | −28.040 | 5.83 | 1.854 | 23.2 |
| S18 | | 305.510 | 41.02 | | |
| S19 | STOP | INF | 39.11 | | |
| S20 | L6 | −218.141 | 5.89 | 1.786 | 25.8 |
| S21 | | −48.257 | 5.17 | | |
| S22 | L7 | −43.612 | 15.00 | 1.84 | 30.4 |
| S23 | | −82.388 | 118.25 | | |
| S24 | L8 | 115.867 | 8.67 | 1.725 | 52.7 |
| S25 | | −1457.379 | 38.13 | | |
| S26 | L9 | 60.540 | 13.26 | 1.729 | 64.7 |
| S27 | | 37.414 | 20.11 | | |
| S28 | L10 | −37.321 | 2.00 | 1.852 | 24.6 |
| S29 | | 1652.453 | 31.10 | | |
| S30 | L11 | −8001.030 | 20.00 | 1.492 | 57.8 |
| S31 | | −237.611 | 180.00 | | |
| S32 | Mirror 1 | 193.418 | −257.64 | | |
| S33 | Mirror 2 | INF | 300 | | |
| S34 | Image surface | INF | | | |

Table 70 shows aspherical coefficients of surface 30 and surface 31. Table 71 shows aspherical coefficients of surface 32.

TABLE 70

| | K | A | B | C | D | E |
|---|---|---|---|---|---|---|
| S11 | −4.71E−10 | −3.26E−06 | 8.41E−10 | −5.28E−14 | −2.16E−18 | −8.07E−23 |
| S12 | −9.67E−13 | −3.32E−06 | 8.04E−10 | −3.54E−13 | 8.61E−17 | −1.35E−20 |

TABLE 71

| | K | C1 | C2 | C3 | C4 | C5 | C6 | C7 | C8 |
|---|---|---|---|---|---|---|---|---|---|
| S32 | −1.04E−01 | 3.94E−03 | −4.23E−04 | 9.59E−06 | −3.59E−07 | 4.44E−09 | −3.42E−11 | 1.41E−13 | −2.45E−16 |

Table 72 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (16) to (18).

TABLE 72

| | |
|---|---|
| f1 | 80.3 |
| f2 | 210.5 |
| f3 | −152.2 |

In this numerical example, it is possible to have a height of the aspherical mirror relative to a screen height not more than 122 mm and an effective area of the mirror not more than 19,145 square millimeters. In a frequency corresponding to QXGA, a white MTF value not less than 65.1% is obtained.

NUMERICAL EXAMPLE 19

Tables 73, 74, and 75 show data on numerical example 19.

TABLE 73

| Surface number | | Curvature radius (mm) | Space (mm) | Refractive index Nd | Abbe number νd |
|---|---|---|---|---|---|
| S0 | Panel | INF | 0 | | |
| S1 | | INF | 0.6 | 1.528 | 70.4 |
| S2 | | INF | 0.75 | | |
| S3 | | INF | 1.2 | 1.518 | 64.2 |
| S4 | | INF | 26.5 | | |
| S5 | | INF | 0.2 | 1.518 | 64.2 |
| S6 | | INF | 0 | | |
| S7 | | INF | 1.5 | 1.518 | 64.2 |
| S8 | | INF | 0 | | |
| S9 | | INF | 63.35 | 1.518 | 64.2 |
| S10 | | INF | 4.85 | | |
| S11 | L1 | 77.129 | 9.03 | 1.852 | 24.9 |
| S12 | | −168.891 | 5.63 | | |
| S13 | L2 | 55.799 | 1.40 | 1.844 | 33.3 |
| S14 | L3 | 28.137 | 15.00 | 1.497 | 79.5 |
| S15 | | −58.640 | 0.50 | | |
| S16 | L4 | −54.864 | 6.46 | 1.827 | 41.2 |
| S17 | L5 | −27.694 | 15.00 | 1.854 | 23.2 |
| S18 | | 351.547 | 35.52 | | |
| S19 | STOP | INF | 36.65 | | |
| S20 | L6 | −171.218 | 5.56 | 1.786 | 26.5 |
| S21 | | −45.563 | 4.53 | | |
| S22 | | −41.701 | 14.46 | 1.84 | 36.3 |

TABLE 73-continued

| Surface number | | Curvature radius (mm) | Space (mm) | Refractive index Nd | Abbe number νd |
|---|---|---|---|---|---|
| S23 | | −78.920 | 105.48 | | |
| S24 | L8 | 119.197 | 8.27 | 1.725 | 58.2 |
| S25 | | −1191.834 | 46.69 | | |
| S26 | L9 | 57.478 | 13.77 | 1.729 | 64.6 |
| S27 | | 36.820 | 18.79 | | |
| S28 | L10 | −37.217 | 5.00 | 1.852 | 24.9 |
| S29 | | 678.044 | 32.26 | | |
| S30 | L11 | −7000.000 | 20.00 | 1.492 | 57.8 |
| S31 | | −210.635 | 180.00 | | |
| S32 | Mirror 1 | 193.099 | −257.43 | | |
| S33 | Mirror 2 | INF | 300 | | |
| S34 | Image surface | INF | | | |

Table 74 shows aspherical coefficients of surface 30 and surface 31. Table 75 shows aspherical coefficients of surface 32.

TABLE 74

| | K | A | B | C | D | E |
|---|---|---|---|---|---|---|
| S11 | 0.00E+00 | −2.64E−06 | 5.29E−10 | 2.15E−15 | −4.78E−18 | −2.15E−22 |
| S12 | −1.03E−04 | −2.67E−06 | 4.54E−10 | −1.91E−13 | 4.23E−17 | −7.60E−21 |

TABLE 75

| | K | C1 | C2 | C3 | C4 | C5 | C6 | C7 | C8 |
|---|---|---|---|---|---|---|---|---|---|
| S32 | −1.01E−01 | 2.32E−04 | −8.00E−05 | 3.42E−06 | −3.10E−07 | 4.28E−09 | −3.42E−11 | 1.43E−13 | −2.50E−16 |

Table 76 shows values of the focal distance f1 of the first lens group I of the lens system, the focal distance f2 of the second lens group II of the lens system, and the combined focal distance f3 of third lens group III and the fourth lens group IV of the lens system in the numerical example. These values satisfy the above-mentioned conditional equations (16) to (18).

TABLE 76

| | |
|---|---|
| f1 | 79.2 |
| f2 | 229.5 |
| f3 | −201.7 |

In this numerical example, it is possible to preferably enlarge and project an image on a light valve as an image having a diagonal length of 60 inches without distortion, the light valve having a diagonal of 0.7 inches and an aspect ratio of 3:4 while having F number on the object side as 2.8. In this case, even in a frequency corresponding to QXGA (0.84 cycles/mm), a white MTF value not less than 59.7% is obtained and it is possible to correct TV distortion value to be not more than 0.5%.

By disposing the mirror for returning between the lens system and the aspherical mirror and flexing the optical axis of the lens system so as to be substantially in parallel with the screen surface, the depth of the apparatus is within 300 mm. It is possible to have a height of the aspherical mirror relative to a screen height not more than 121 mm and an effective area of the mirror not more than 19,031 square millimeters.

In accordance with the above-mentioned numerical examples (3 to 19), it is understood that within the range where the conditional equations are satisfied, even when a resolution frequency is higher than a conventional level, it is possible to enlarge and project an image in a practical level MTF (resolution) without distortion, construct a thin depth for the apparatus, and reduce the size of the aspherical mirror.

The reduced size of the mirror provides effects of reducing a size outside a screen area in a rear-projection image display apparatus and constructing a smaller apparatus in addition to reducing a cost of the mirror.

In the above-mentioned embodiments, surface 33 indicates the plane mirror for returning when a rear-projection structure is assumed. In a case of front projection, surface 33 may be eliminated. A distance between surface 33 to surface 34 is the depth of the apparatus when the rear-projection structure is assumed.

By disposing the mirror between surface 31 and surface 32 and flexing the optical axis of the lens system so as to be substantially in parallel with the image surface, it is possible to have a thin depth for the apparatus without protruding the lens system in the depth direction of the apparatus as shown in FIG. 9.

Between the lenses of the lens system, the plane mirror may be disposed as appropriate and the lens system may be flexed. In this manner, it is possible to lay out the optical system with a smaller size.

On the object surface, a transmissive light valve may be disposed in addition to the reflective light valve and LCOS (Liquid Crystal on Silicon) device. A projection distance is from surface 31 to surface 34. For example, the projection distance is 557.43 mm in the case of numerical example 3. Further, according to the combination of the above-mentioned conditional equations, it is possible to secure a sufficient back focal distance for the reflective light valve such as LCOS in the first lens group I.

In the above-mentioned numerical examples (3 to 19), a range of aspherical coefficients K of the aspherical mirror is not less than −0.1 to not more than −0.095. A range of C1 is not less than 3×10-5 to not more than 4×10-3, a rage of C2 is not less than −4×10-4 to not more than −5×10-6, a range of C3 is not less than 3×10-6 to not more than 1×10-5, a range of C4 is not less than −3.6×10-7 to not more than −3.0×10-7, a range of C5 is not less than 4.2×10-9 to not more than 4.5×10-9, a range of C6 is not less than −3.4×10-11 to not more than −3.41×10-11, a range of C7 is not less than 1.41×10-13 to not more than 1.43×10-13, a range of CB is not less than −2.5× 10-16 to not more than −2.45×10-16, and radius of curvature is not less than 192 to not more than 194.

In the following, an example of optical arrangement of an image display apparatus (fifth embodiment) using the above-mentioned projection optical system is described.

Figure 10:
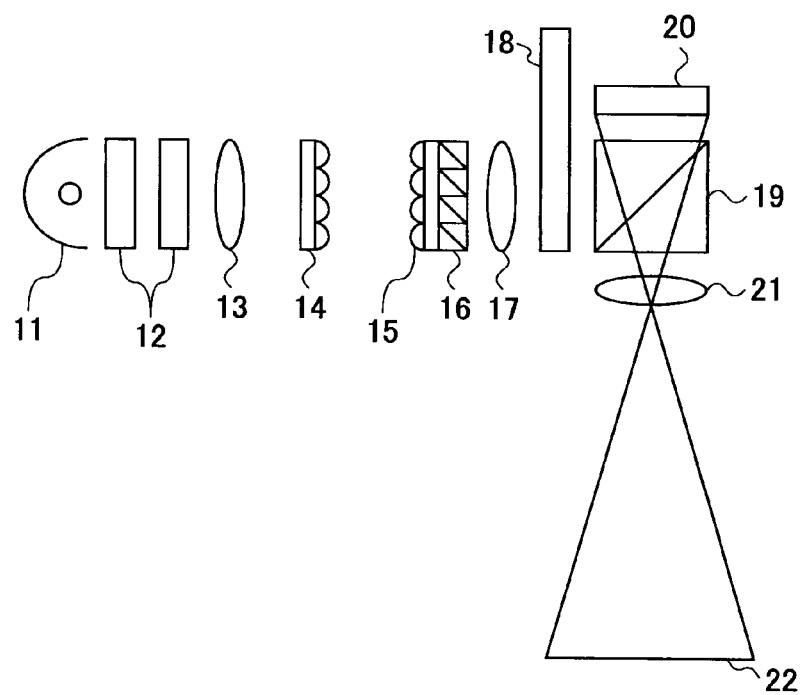
FIG. 10 is a schematic diagram of an image display apparatus according to a fifth embodiment of the present invention.

In the optical arrangement of the image display apparatus shown in FIG. 10, infrared rays and ultraviolet rays of light fluxes emitted from a light source 11 are cut in a filter 12 and the light fluxed are projected onto a condenser lens 13. Examples of the light source 11 include a halogen lamp, xenon lamp, metal halide lamp, extra-high pressure mercury lamp, LED, and the like. The condenser lens 13 corrects parallelism of the light fluxes.

The light fluxes whose parallelism is corrected in the condenser lens 13 are separated in plural apertures using a first fly's-eye lens array 14 and condensed in each lens of the fly's-eye lens array 14. A second fly's-eye lens array 15 is disposed on condensing areas and images of the light source are formed on pupils. These pupils of the second fly's-eye lens array 15 are regarded as plural secondary light sources.

The light fluxes emitted from the second fly's-eye lens array 15 are polarization converted in a polarization beam splitter array 16, parallelism of the light fluxes is corrected in a condenser lens 17. Then the light fluxes are irradiated onto a polarization beam splitter array 19 through a color filter 18, the light fluxes are reflected on polarization splitting surface, and the light fluxes are projected onto a light valve 20. The light valve 20 includes LCOS and the like.

Polarization status of the light fluxes reflected on the light valve 20 is modulated in accordance with an image displayed on an image display surface (object surface of the above-mentioned projection optical system) of the light valve 20. When the light fluxes are projected onto the polarization beam splitter array 19, components whose polarization status is modulated pass through the polarization beam splitter array 19 as an image light and are projected onto a screen 22 as an image display unit so as to form an image through a projection optical system 21.

The color filter 18 is capable of selectively passing each of three primary colors of red, green, and blue. The color filter 18 is configured to cyclically switch the colors to be passed, namely, sequentially from red, green, and blue, for example. The color filter 18 field sequentially changes colors of light fluxes for lighting to be passed through the color filter 18 and lighting is performed in a time division manner. Accordingly, an image on the light valve 20 is displayed by switching sequentially from image components of red, green, and blue. In this case, the cross prism is not necessary. In this manner, it is possible to project and display a color image on the screen 22.

It is possible to realize an image display apparatus by employing the projection optical system according to the above-mentioned numerical examples 1 to 19 and variations thereof as the projection optical system 21 shown as a single lens in FIG. 10.

The light fluxes incident on the light valve 20 are made to be substantially perpendicular relative to the image display surface of the light valve 20. The light source 11 has a finite size, so that it is difficult to make the light fluxes for lighting as completely parallel light fluxes. Although an angle of the light fluxes for lighting is distributed in a range of ± several degrees, the light fluxes for lighting are substantially perpendicular relative to the image display surface of the light valve 20.

The light valve side of the projection optical system 21 (according to numerical examples 1 to 19 and variations thereof) is substantially telecentric, so that it is possible to use the polarization beam splitter array 19 with preferable polarization split characteristics. Deterioration of polarization split characteristics may become a factor in reduced contrast.

Figure 11:
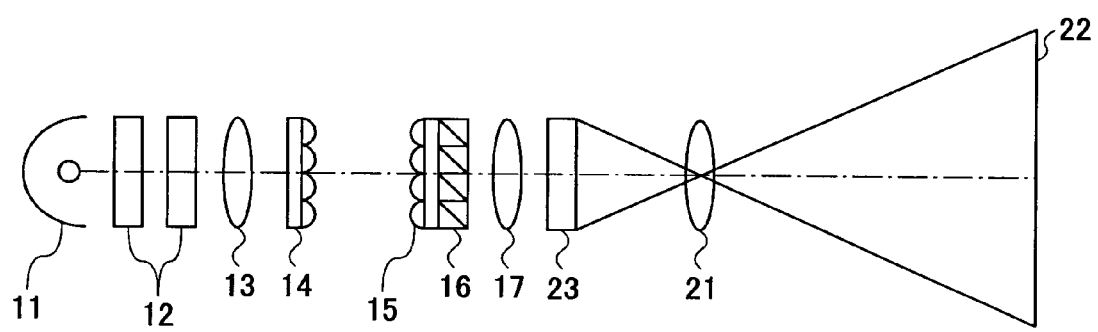
FIG. 11 is a schematic diagram of an image display apparatus according to a sixth embodiment of the present invention.

FIG. 11 shows an example of optical arrangement of an image display apparatus (sixth embodiment) using a transmissive light valve 23. The same reference numerals as in FIG. 10 are given to the same elements or portions so as to avoid complicating description. The optical arrangement from the light source 11 to the condenser lens 17 is the same as in the optical arrangement in FIG. 10.

The light fluxes for lighting whose parallelism is corrected in the condenser lens 17 pass through the transmissive light valve 23 and polarization status of the light fluxes is modulated in accordance with an image displayed on the image display surface (object surface of the above-mentioned projection optical system) of the light valve 23. The light fluxes become the image light and are projected onto the screen 22 as an image display unit so as to form an image through the projection optical system 21. Specifically, the projection optical system 21 is based on the above-mentioned numerical examples 1 to 19 and variations thereof.

In this case, in the same manner as in the embodiment of FIG. 10, it is possible to project and display a color image on the screen 22 by disposing the color filter 18 between the condenser lens 17 and the transmissive light valve 23, performing lighting in a time division manner while field sequentially changing changes colors of light fluxes for lighting, and switching sequentially from image components of red, green, and blue for the image displayed on the transmissive light valve 23.

Figure 12:
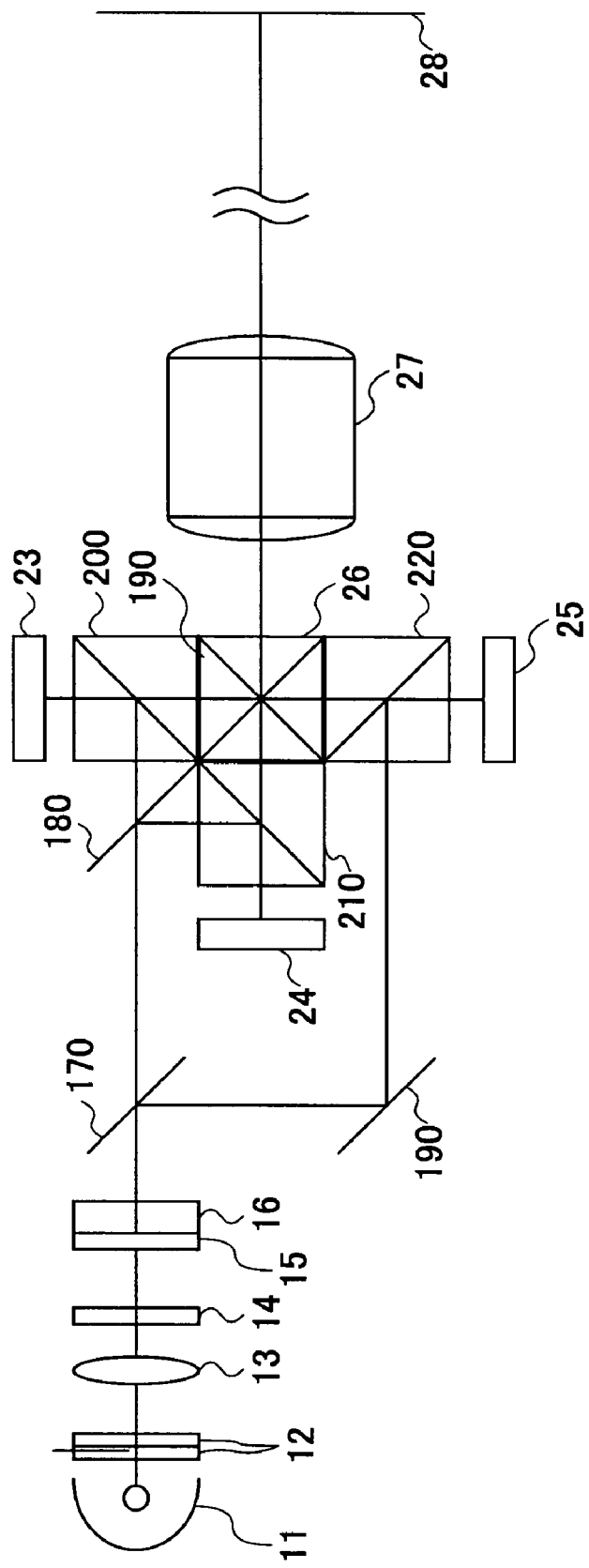
FIG. 12 is a schematic diagram of an image display apparatus according to a seventh embodiment of the present invention.

FIG. 12 shows an example of optical arrangement of a three-plate image display apparatus (seventh embodiment) using three reflective light valves. The same reference numerals as in FIG. 10 are given to the same elements or portions so as to avoid complicating description.

Infrared rays and ultraviolet rays of the light fluxes emitted from the light source 11 are cut in the filter 12 and the light fluxed are projected onto the condenser lens 13. The light fluxes are passed through the first fly's-eye lens array 14 and the second fly's-eye lens array 15 and the light fluxes emitted from the second fly's-eye lens array 15 are polarization converted in a polarization beam splitter array 16. The polarization converted light fluxes are separated into three colors of red, green, and blue in dichroic mirrors 170 and 180. Optical paths are adjusted in a mirror 190, polarization beam splitters 200, 210, and 220 are disposed on the optical paths of each of color component lights so as to guide the color component lights to light valves 23, 24, and 25 for lighting. Reflected lights from each light valve are integrated in a cross prism 26 and the integrated light is projected onto a screen 28 through a projection optical system 27 so as to form an image. In this manner, it is possible to realize preferable image quality without generating color breakup.

Specifically, the projection optical system 27 is based on the above-mentioned numerical examples 1 to 19 and variations thereof.

As mentioned above, it is possible to realize an image display apparatus for enlarging and projecting an image of a light valve by employing the above-mentioned projection optical system for an image display apparatus for lighting an image display surface of the light valve using a lighting unit, guiding a display image on the light valve to a display unit using an enlargement projection optical system so as to enlarge and display the image of the light valve.

In the image display apparatus, the back focal distance is secured and the optical path on the light valve side is telecentric (telecentricity is obtained), so that it is possible to use a reflective light valve such as LCOS superior in responsibility and contrast properties, preferably correct distortion of an image even when obliquely projecting on the image surface, and constructing the apparatus with a reduced projection distance and reduced thickness.

As for the light source 11, in addition to a lamp light source such as a metal halide lamp as mentioned above, an LED light source may be partially used and an LD light source may also be used in combination with the LED light source. When such LED and LD are used for the light source, a produce life is elongated in comparison with a case where the lamp light source is used. Further, because of selectivity of emission wavelength, the necessity of the optical system for separating colors is eliminated or a range of color reproduction is extended by using LEDs of not less than four colors.

According to the present invention, in the projection optical system in which the projection distance is reduced by using the lens system and the convex mirror, it is possible to obtain higher resolution capability with arrange conditions suitable for the reflective light valve such as LCOS in comparison with conventional apparatuses.

The present invention is not limited to the specifically disclosed embodiment, and variations and modifications may be made without departing from the scope of the present invention.

The present application is based on Japanese priority application No. 2006-127840 filed May 1, 2006, Japanese priority application No. 2007-047702 filed Feb. 27, 2007, the entire contents of which are hereby incorporated herein by reference.

What is claimed is:

1. A projection optical system for projecting and forming an enlarged image of an image displayed in a planar manner as an object, the projection optical system comprising:
   a lens system including, from an object side, at least a lens group providing telecentricity to an object space side, a lens group controlling divergence of angles of view, a diaphragm, a lens group converging the angles of view, and a lens group converging and subsequently enlarging the angles of view; and
   a catoptric system disposed on an image side relative to the lens system and including a mirror having negative power, wherein
   each lens group of the lens system and the mirror having negative power share an optical axis and the optical axis is shifted relative to a center of an object surface.

2. The projection optical system according to claim 1, wherein
   the lens groups of lens system are arranged sequentially from the object side as a first lens group to a fourth lens group,
   the first lens group to the third lens group have positive power and integrated power of the third lens group and the fourth lens group is negative, and
   the diaphragm is disposed between the second lens group and the third lens group.

3. The projection optical system according to claim 2, wherein
   a cemented lens is disposed on the object side relative to the diaphragm.

4. The projection optical system according to claim 1, wherein
   the lens groups of lens system are arranged sequentially from the object side as a first lens group to a fourth lens group,
   the first lens group to the third lens group have positive power and integrated power of the fourth lens group without a lens disposed closest to the image side is negative,
   the lens disposed closest to the image side has a meniscus shape convex relative to the image side, and
   the diaphragm is disposed between the second lens group and the third lens group.

5. The projection optical system according to claim 1, wherein
   at least one aspherical surface is included in the lens system.

6. The projection optical system according to claim 5, wherein
   not more than two aspherical surfaces are disposed in the lens system.

7. The projection optical system according to claim 5, wherein
   both surfaces of the lens of the fourth lens group in the lens system disposed closest to the image side are aspherical.

8. The projection optical system according to claim 7, wherein the lens of the fourth lens group disposed closest to the image side is made of synthetic resin.

9. The projection optical system according to claim 1, wherein a mirror surface of the mirror having negative power in the catoptric system is a rotationally-symmetric aspherical surface.

10. The projection optical system according to claim 9, wherein the rotationally-symmetric aspherical surface of the mirror surface of the mirror having negative power in the catoptric system includes odd terms and even terms.

11. The projection optical system according to claim 1, wherein at least one mirror for flexing optical path is disposed in the lens system or between the lens system and a mirror of the catoptric system disposed closest to the lens system.

* * * * *